(12) United States Patent
Brossard et al.

(10) Patent No.: US 12,517,518 B2
(45) Date of Patent: Jan. 6, 2026

(54) SYSTEMS AND METHODS FOR AUTONOMOUS FIELD NAVIGATION

(71) Applicant: Carbon Autonomous Robotic Systems Inc., Seattle, WA (US)

(72) Inventors: Evan William Brossard, Seattle, WA (US); Raven Pillmann, Seattle, WA (US); Paul Mikesell, Bellevue, WA (US); Alexander Igorevich Sergeev, Newcastle, WA (US)

(73) Assignee: Carbon Autonomous Robotic Systems Inc., Seattle, WA (US)

( * ) Notice: Subject to any disclaimer, the term of this patent is extended or adjusted under 35 U.S.C. 154(b) by 353 days.

(21) Appl. No.: 18/137,833

(22) Filed: Apr. 21, 2023

(65) Prior Publication Data

US 2023/0384794 A1    Nov. 30, 2023

Related U.S. Application Data

(60) Provisional application No. 63/336,782, filed on Apr. 29, 2022.

(51) Int. Cl.
*G05D 1/02*    (2020.01)
*A01B 69/04*   (2006.01)
*G05D 1/00*    (2024.01)

(52) U.S. Cl.
CPC ......... *G05D 1/0231* (2013.01); *A01B 69/008* (2013.01); *G05D 1/0088* (2013.01)

(58) Field of Classification Search
None
See application file for complete search history.

(56) References Cited

U.S. PATENT DOCUMENTS

| | | |
|---|---|---|
| 6,795,568 B1 | 9/2004 | Christensen et al. |
| 9,526,199 B2 | 12/2016 | Matsuzaki et al. |
| 9,565,848 B2 | 2/2017 | Stowe et al. |
| 9,609,859 B2 | 4/2017 | Stowe et al. |
| 10,010,067 B2 | 7/2018 | Kent et al. |
| 10,051,854 B2 | 8/2018 | Stowe et al. |

(Continued)

FOREIGN PATENT DOCUMENTS

| | | |
|---|---|---|
| EP | 2848119 B1 | 12/2016 |
| EP | 3302052 B1 | 10/2019 |

(Continued)

OTHER PUBLICATIONS

Machine translation of JP-2021061015-A (Year: 2021).*

(Continued)

*Primary Examiner* — Anne Marie Antonucci
*Assistant Examiner* — Kyle S Park
(74) *Attorney, Agent, or Firm* — Fortem IP LLP

(57) ABSTRACT

Disclosed herein are systems and methods for autonomously navigating a vehicle along furrows in a field. Also disclosed herein are systems and methods for autonomously turning a vehicle at the end of a furrow within a designated turnaround area to begin navigating along a second furrow. Turns may be determined in real time using sensors to determine target positions, and the turns may be dynamically updated while being executed. These systems and methods may be used for automated crop management, such as autonomous weeding, planting, spraying, or harvesting.

28 Claims, 15 Drawing Sheets

(56) References Cited

U.S. PATENT DOCUMENTS

| | | |
|---|---|---|
| 10,266,201 B2 | 4/2019 | Dang et al. |
| 10,750,736 B2 | 8/2020 | Kent et al. |
| 11,048,940 B2 | 6/2021 | Kiepe et al. |
| 11,076,589 B1 | 8/2021 | Sibley et al. |
| 11,093,745 B2 | 8/2021 | Redden et al. |
| 11,129,343 B2 | 9/2021 | Redden et al. |
| 11,344,022 B2 | 5/2022 | Jackson et al. |
| 11,373,288 B2 | 6/2022 | Peters |
| 11,375,707 B1 | 7/2022 | Guice et al. |
| 11,399,531 B1 | 8/2022 | Sibley et al. |
| 11,425,852 B2 | 8/2022 | Sibley et al. |
| 11,432,470 B2 | 9/2022 | Kurihara et al. |
| 11,517,008 B1 | 12/2022 | Sibley et al. |
| 11,553,634 B2 | 1/2023 | Grant et al. |
| 11,553,636 B1 | 1/2023 | Palomares et al. |
| 11,589,570 B2 | 2/2023 | Schlemmer |
| 11,602,143 B2 | 3/2023 | Mikesell et al. |
| 11,694,434 B2 | 7/2023 | Sibley et al. |
| 11,748,976 B2 | 9/2023 | Redden et al. |
| 11,751,559 B2 | 9/2023 | Sibley et al. |
| 11,785,873 B2 | 10/2023 | Sibley et al. |
| 11,937,524 B2 | 3/2024 | Sibley et al. |
| 12,056,845 B2 | 8/2024 | Peake et al. |
| 2016/0109885 A1 | 4/2016 | Fujimoto et al. |
| 2016/0205918 A1 | 7/2016 | Chan et al. |
| 2017/0144702 A1* | 5/2017 | Dang ............... B62D 6/001 |
| 2018/0156622 A1* | 6/2018 | Mouthaan ........ G01C 21/3407 |
| 2019/0274296 A1 | 9/2019 | Schmidt |
| 2020/0120886 A1 | 4/2020 | Geltner |
| 2022/0254155 A1 | 8/2022 | Janssen et al. |
| 2022/0361475 A1 | 11/2022 | Bachman et al. |
| 2023/0044040 A1 | 2/2023 | Xu et al. |
| 2023/0121291 A1 | 4/2023 | Sibley et al. |
| 2023/0122084 A1 | 4/2023 | Sibley et al. |
| 2023/0137419 A1 | 5/2023 | Sergeev et al. |
| 2023/0232811 A1 | 7/2023 | Einat |
| 2023/0237697 A1 | 7/2023 | Pillmann et al. |
| 2023/0247928 A1 | 8/2023 | Sibley et al. |
| 2023/0252624 A1 | 8/2023 | Sergeev et al. |
| 2023/0252789 A1 | 8/2023 | Sibley et al. |
| 2023/0252791 A1 | 8/2023 | Webb et al. |
| 2023/0270036 A1 | 8/2023 | Groffils et al. |
| 2023/0292736 A1 | 9/2023 | Mikesell et al. |
| 2023/0292737 A1 | 9/2023 | Thompson et al. |
| 2023/0309444 A1 | 10/2023 | Cordeiro et al. |
| 2023/0333011 A1 | 10/2023 | Dev et al. |
| 2023/0343090 A1 | 10/2023 | Khait et al. |
| 2023/0360392 A1 | 11/2023 | Sibley et al. |
| 2023/0363370 A1 | 11/2023 | Delatree et al. |
| 2023/0371493 A1 | 11/2023 | Werner et al. |
| 2023/0397597 A1 | 12/2023 | Charipar et al. |
| 2023/0404056 A1 | 12/2023 | Sibley et al. |
| 2023/0413800 A1 | 12/2023 | Jasko et al. |
| 2024/0020951 A1 | 1/2024 | Redden et al. |
| 2024/0041018 A1 | 2/2024 | Mikesell et al. |
| 2024/0049697 A1 | 2/2024 | Schmeer et al. |
| 2024/0057502 A1 | 2/2024 | Sibley et al. |
| 2024/0069557 A1* | 2/2024 | Morimoto ............ G05D 1/0278 |
| 2024/0074427 A1 | 3/2024 | Tanner |
| 2024/0155221 A1 | 5/2024 | Watanabe |
| 2024/0206451 A1 | 6/2024 | Anderson |
| 2024/0224977 A9 | 7/2024 | Leger et al. |
| 2024/0251694 A1 | 8/2024 | Sibley et al. |
| 2024/0268246 A1 | 8/2024 | Stark et al. |
| 2024/0268277 A1 | 8/2024 | Cochrane et al. |

FOREIGN PATENT DOCUMENTS

| | | |
|---|---|---|
| EP | 3700337 A1 | 9/2020 |
| EP | 3700338 A1 | 9/2020 |
| EP | 3937628 A1 | 1/2022 |
| EP | 4031832 A1 | 7/2022 |
| EP | 4147942 A1 | 3/2023 |
| EP | 4175470 A2 | 5/2023 |
| EP | 3618609 B1 | 8/2023 |
| EP | 4228403 A1 | 8/2023 |
| EP | 4228404 A1 | 8/2023 |
| EP | 4243592 A1 | 9/2023 |
| EP | 4243613 A1 | 9/2023 |
| EP | 4301135 A1 | 1/2024 |
| EP | 4309129 A1 | 1/2024 |
| EP | 4185106 B1 | 5/2024 |
| EP | 4358712 A1 | 5/2024 |
| EP | 4358713 A1 | 5/2024 |
| EP | 4358714 A1 | 5/2024 |
| EP | 3675621 B1 | 8/2024 |
| EP | 3741214 B1 | 8/2024 |
| EP | 4418845 A1 | 8/2024 |
| JP | H11288312 A | 10/1999 |
| JP | 6533260 B2 | 5/2019 |
| JP | 2021061015 A * | 4/2021 |
| KR | 20150124305 A | 11/2015 |
| WO | 2002017705 A1 | 7/2004 |
| WO | 2019124273 A1 | 6/2019 |
| WO | 2022168423 A1 | 8/2022 |
| WO | 2023021769 A1 | 2/2023 |
| WO | 2023058333 A1 | 4/2023 |
| WO | 2023150023 A1 | 8/2023 |
| WO | 2023180566 A1 | 9/2023 |
| WO | 2023211775 A1 | 11/2023 |
| WO | 2024165111 A1 | 8/2024 |
| WO | 2024168302 A1 | 8/2024 |

OTHER PUBLICATIONS

Nadimi, et al., "Designing, modeling and controlling a novel autonomous laser weeding system", ASABE Technical Library—Jan. 2009; pp. 8.

International Search Report and Written Opinion mailed Sep. 14, 2023 International Application No. PCT/US2023/019376, 18 pages.

Ferdinand N., "A Deep Dive into Lane Detection with Hough Transform," Towards Data Science, May 5, 2020, 27 pages.

Wang W., et al., "CNN Based Lane Detection with Instance Segmentation in Edge-Cloud Computing," Journal of Cloud Computing: Advances, Systems and Applications, 2020, vol. 9, No. 27, pp. 1-10.

* cited by examiner

SYSTEMS AND METHODS FOR AUTONOMOUS FIELD NAVIGATION

CROSS-REFERENCE

The present application claims the benefit of U.S. Provisional Application No. 63/336,782, entitled "SYSTEMS AND METHODS FOR AUTONOMOUS FIELD NAVIGATION," filed on Apr. 29, 2022, which application is herein incorporated by reference in its entirety for all purposes.

BACKGROUND

Agricultural output is valued at trillions of dollars annually worldwide. Agriculture is an essential component of food production and includes cultivation of both livestock and plants. Rising population and decreased crop yield due to changing climate threaten global food security. Methods for increasing agricultural production by improving crop yield and boosting labor efficiency may help mitigate food shortages. There is a need for navigation systems with increased autonomy and precision to improve farming efficiency.

SUMMARY

In various aspects, the present disclosure provides a system for autonomously driving a vehicle, the system comprising: a steering controller to drive the vehicle; a processor coupled to the steering controller, wherein the processor is configured to determine a first turnaround area corresponding to a first field exit path having a first field exit position and a first field re-entry path and having a first field re-entry position, wherein the first turnaround area is bound by an outer boundary and an inner boundary, wherein the outer boundary encompasses the inner boundary, wherein the inner boundary extends through the first field exit position and the first field re-entry position, and wherein the inner boundary encompasses a planting region a field; a location sensor coupled to the processor to identify a location of the vehicle; and memory coupled to the processor storing instructions that, when executed by the processor, cause the steering controller to execute a first turn by: driving the vehicle along the first field exit path toward the first field exit position at the inner boundary, upon encountering the inner boundary at the first field exit position, driving the vehicle toward a first forward position, upon encountering the outer boundary, reversing the vehicle toward a first correction position, upon reaching the first correction position, driving the vehicle toward the first forward position, upon reaching the first forward position, reversing the vehicle toward a first reverse position, upon reaching the first reverse position or encountering the outer boundary, driving the vehicle forward toward the first field re-entry position at the inner boundary.

In some aspects, the first forward position is positioned relative to the first field re-entry position based on a vehicle turning radius and a vehicle width. In some aspects, the first forward position is positioned at least one vehicle width from the first field re-entry position in a direction opposite the first field re-entry path and at least one vehicle turning radius from the first field re-entry position in a direction opposite the first field exit position. In some aspects, a first forward heading is parallel to a line connecting the first field exit position to the first field re-entry position. In some aspects, the first correction position is positioned relative to the first field exit position based on a vehicle length. In some aspects, the first correction position is positioned at least one vehicle length from the first field exit position in a direction opposite the first field re-entry position. In some aspects, the first reverse position is positioned relative to the first field re-entry position based on a vehicle length. In some aspects, the first reverse position is positioned at least one vehicle length from the first field re-entry position in a direction opposite the first field re-entry path. In some aspects, the first field re-entry position is positioned along the inner boundary. In some aspects, the first field exit path, the first field re-entry path, or both is linear. In some aspects, the first field exit path is parallel to the first field re-entry path.

In some aspects, the inner boundary is curvilinear. In some aspects, the outer boundary is curvilinear. In some aspects, a region of the inner boundary between the first field exit position and the first field re-entry position is not perpendicular to the first field exit path, the first field re-entry path, or both. In some aspects, the inner boundary encompasses a field. In some aspects, the outer boundary is encompassed by an outer geofence. In some aspects, the outer boundary is separated from the outer geofence by at least one vehicle length. In some aspects, the first field exit path is separated from the first field re-entry path by a furrow spacing distance. In some aspects, the first field exit path, the first field re-entry path, or both are parallel to a furrow in the field.

In some aspects, the first turn is further executed by: before reaching the first reverse position and upon encountering the outer boundary, reversing the vehicle toward the first field re-entry position; and upon reaching the first field re-entry position oriented in a direction other than along the first field re-entry path, reversing the vehicle toward the first reverse position. In some aspects, the first turn is determined in real time, determined adaptively, or both. In some aspects, the first turn is updated as the first turn is executed.

In some aspects, the processor is further configured to determine a second turnaround area corresponding to a second field exit path having a second field exit position and a second field re-entry path and having a second field re-entry position, wherein the second turnaround area is bound by the outer boundary and the inner boundary, wherein the inner boundary extends through the second field exit position and the second field re-entry position; and wherein the instructions further cause the steering controller to execute a second turn by: driving the vehicle along the second field exit path toward a second field exit position; upon encountering the inner boundary at the second field exit position, driving the vehicle toward a second forward position; upon reaching the second forward position, reversing the vehicle toward a second reverse position; upon reaching the second reverse position or encountering the outer boundary, reversing the vehicle toward a second field re-entry position at the inner boundary. In some aspects, the first turn and the second turn are different. In some aspects, the second turn is determined in real time, determined adaptively, or both. In some aspects, the second turn is updated as the first turn is executed.

In some aspects, the processor is further configured to detect a furrow between the first field re-entry position and the second field exit position. In some aspects, the process is configured to identify the furrow in a depth image of a field and a visual image of the field, determine the furrow location, and determine the furrow direction. In some aspects, identifying the furrow further comprises generating a segmentation map from the visual image. In some aspects, determining the furrow direction further comprises determining a center of the furrow from the depth image. In some aspects, determining the furrow location and determining the furrow direction further comprise determining location values and direction values for pixels of the visual image corresponding to the furrow. In some aspects, the processor is further configured to determine a representative location and a representative direction based on the location values and the direction values, wherein the representative location corresponds to the furrow location and the representative direction corresponds to the furrow direction.

In some aspects, the instructions, when executed by the processor, further cause the steering controller to follow the furrow to the second field exit position. In some aspects, the first field exit position, the first field exit path, the first field re-entry position, the first field re-entry path, the first forward position, the first correction position, the first reverse position, the second field exit position, the second field exit path, the second field re-entry position, the second field re-entry path, the second forward position, the second reverse position, or a combination thereof are determined based on a sensor input. In some aspects, the first field exit position, the first field exit path, the first field re-entry position, the first field re-entry path, the first forward position, the first correction position, the first reverse position, the second field exit position, the second field exit path, the second field re-entry position, the second field re-entry path, the second forward position, the second reverse position, or a combination thereof are determined in real time. In some aspects, the first field exit position, the first field exit path, the first field re-entry position, the first field re-entry path, the first forward position, the first correction position, the first reverse position, the second field exit position, the second field exit path, the second field re-entry position, the second field re-entry path, the second forward position, the second reverse position, or a combination thereof are determined adaptively. In some aspects, the first field exit position, the first field exit path, the first field re-entry position, the first field re-entry path, the first forward position, the first correction position, the first reverse position, the second field exit position, the second field exit path, the second field re-entry position, the second field re-entry path, the second forward position, the second reverse position, or a combination thereof are independent of a speed of the vehicle. In some aspects, the first field exit position, the first field exit path, the first field re-entry position, the first field re-entry path, the first forward position, the first correction position, the first reverse position, the second field exit position, the second field exit path, the second field re-entry position, the second field re-entry path, the second forward position, the second reverse position, or a combination thereof are independent of a turning rate of the vehicle.

In some aspects, the processor is further configured to generate an alert to request human intervention. In some aspects, the alert is generated when the vehicle fails to reach the first field exit position, the first correction position, the first forward position, the first reverse position, the first field re-entry position, the second field exit position, the second correction position, the second forward position, the second reverse position, or the second field re-entry position after a predetermined number of attempts. In some aspects, the predetermined number of attempts is from 2 to 10 attempts, from 3 to 8 attempts, or from 4 to 6 attempts. In some aspects, the predetermined number of attempts is about 5 attempts. In some aspects, the alert is generated when the vehicle crosses the outer boundary or exceeds the outer boundary by a predetermined distance. In some aspects, the predetermined distance is from 0.5 to 1.5 vehicle lengths. In some aspects, the predetermined distance is about one vehicle length. In some aspects, the alert is generated when the system fails to detect a furrow at the first field re-entry position or between the first field re-entry position and the second field exit position. In some aspects, the alert is generated when the system detects an obstacle. In some aspects, the alert is configured to be transmitted over a network. In some aspects, the alert comprises an image collected from the vehicle, the location of the vehicle, a position of the steering controller, a satellite image of the vehicle, or combinations thereof.

In some aspects, the processor is further configured to receive instructions from a human after the alert is generated. In some aspects, the instructions are provided remotely. In some aspects, the processor is further configured to continue to execute the first turn, execute the second turn, or follow the furrow after the instructions have been provided. In some aspects, the system further comprises an obstacle detection sensor configured to detect obstacles. In some aspects, the obstacle detection sensor comprises a LIDAR sensor. In some aspects, the location sensor comprises a global positioning system sensor. In some aspects, the location sensor comprises a camera.

In some aspects, the vehicle is a farming vehicle. In some aspects, the vehicle is a tractor, a weeder, a sprayer, or a planter.

In various aspects, the present disclosure provides a method of autonomously driving a vehicle in a field, the method comprising: determining a turnaround area corresponding to a field exit path having a first field exit position and a first field re-entry path and having a first field re-entry position, wherein the first turnaround area is bound by an outer boundary and an inner boundary, wherein the outer boundary encompasses the inner boundary, wherein the inner boundary extends through the first field exit position and the first field re-entry position, and wherein the inner boundary encompasses a planting region the field; driving the vehicle along the first field exit path toward the first field exit position at the inner boundary; upon encountering the inner boundary at the first field exit position, driving the vehicle toward a first forward position; upon encountering the outer boundary, reversing the vehicle toward a first correction position; upon reaching the first correction position, driving the vehicle toward the first forward position; upon reaching the first forward position, reversing the vehicle toward a first reverse position; upon reaching the first reverse position or encountering the outer boundary, driving the vehicle forward toward the first field re-entry position at the inner boundary.

In some aspects, the method further comprises driving the vehicle at a variable speed. In some aspects, the method further comprises, before reaching the first reverse position and upon encountering the outer boundary, reversing the vehicle toward the first field re-entry position; and upon reaching the first field re-entry position oriented in a direction other than along the first field re-entry path, reversing the vehicle toward the first reverse position.

In some aspects, the method further comprises: determining a second turnaround area corresponding to a second field exit path having a second field exit position and a second field re-entry path and having a second field re-entry position, wherein the second turnaround area is bound by the outer boundary and the inner boundary, wherein the inner boundary extends through the second field exit position and the second field re-entry position; driving the vehicle along the second field exit path toward a second field exit position; upon encountering the inner boundary at the second field exit position, driving the vehicle toward a second forward position; upon reaching the second forward position, reversing the vehicle toward a second reverse position; upon reaching the second reverse position or encountering the outer boundary, reversing the vehicle toward a second field re-entry position at the inner boundary.

In some aspects, the method further comprises following a furrow between the first field re-entry position and the second field exit position. In some aspects, following the furrow comprises identifying the furrow in a depth image of a field, a visual image of the field, or both, and determining the furrow location, the furrow direction, or both. In some aspects, identifying the furrow further comprises generating a segmentation map from the visual image. In some aspects, determining the furrow direction further comprises determining a center of the furrow from the depth image. In some aspects, determining the furrow location and determining the furrow direction further comprise determining location values and direction values for pixels of the visual image corresponding to the furrow.

In some aspects, the method further comprises determining a representative location and a representative direction based on the location values and the direction values, wherein the representative location corresponds to the furrow location and the representative direction corresponds to the furrow direction. In some aspects, the method is determined in real time, determined adaptively, or both. In some aspects, the method is updated as the method is executed.

In some aspects, the method further comprises determining the first field exit position, the first field exit path, the first field re-entry position, the first field re-entry path, the first forward position, the first correction position, the first reverse position, the second field exit position, the second field exit path, the second field re-entry position, the second field re-entry path, the second forward position, the second reverse position, or a combination thereof based on a sensor input. In some aspects, the method further comprises determining in real-time the first field exit position, the first field exit path, the first field re-entry position, the first field re-entry path, the first forward position, the first correction position, the first reverse position, the second field exit position, the second field exit path, the second field re-entry position, the second field re-entry path, the second forward position, the second reverse position, or a combination thereof. In some aspects, the method further comprises adaptively determining the first field exit position, the first field exit path, the first field re-entry position, the first field re-entry path, the first forward position, the first correction position, the first reverse position, the second field exit position, the second field exit path, the second field re-entry position, the second field re-entry path, the second forward position, the second reverse position, or a combination thereof.

In some aspects, the method further comprises generating an alert to request human intervention. In some aspects, the method comprises generating the alert when the vehicle fails to reach the first field exit position, the first correction position, the first forward position, the first reverse position, the first field re-entry position, the second field exit position, the second correction position, the second forward position, the second reverse position, or the second field re-entry position after a predetermined number of attempts. In some aspects, the method comprises attempting to reach the first field exit position, the first correction position, the first forward position, the first reverse position, the first field re-entry position, the second field exit position, the second correction position, the second forward position, the second reverse position, or the second field re-entry position from 2 to 10 times, from 3 to 8 times, or from 4 to 6 times prior to generating the alert. In some aspects, the method comprises attempting to reach the first field exit position, the first correction position, the first forward position, the first reverse position, the first field re-entry position, the second field exit position, the second correction position, the second forward position, the second reverse position, or the second field re-entry position about 5 times prior to generating the alert.

In some aspects, the method comprises generating the alert when the vehicle crosses the outer boundary or exceeds the outer boundary by a predetermined distance. In some aspects, the method comprises generating the alert when the vehicle exceeds the outer boundary by a distance of 0.5 to 1.5 vehicle lengths. In some aspects, the method comprises generating the alert when the vehicle exceeds the outer boundary by a distance of about one vehicle length. In some aspects, the method comprises generating the alert when the system fails to detect a furrow at the first field re-entry position or between the first field re-entry position and the second field exit position. In some aspects, the method comprises generating the alert when the system detects an obstacle. In some aspects, the method comprises transmitting the alert over a network.

In some aspects, the method further comprises transmitting an image collected from the vehicle, the location of the vehicle, a position of the steering controller, a satellite image of the vehicle, or combinations thereof with the alert. In some aspects, the method further comprises receiving instructions from a human after the alert is generated. In some aspects, the instructions received over a network. In some aspects, the method comprises continuing to execute the first turn, execute the second turn, or follow the furrow after the instructions have been received.

In some aspects, the method further comprises detecting an obstacle with an obstacle detection sensor. In some aspects, the obstacle detection sensor comprises a LIDAR sensor.

In some aspects, the method is executed by a system of as described herein.

In various aspects, the present disclosure provides a computer-implemented method to detect a furrow in a field, the computer-implemented method comprising: receiving a depth image of a field and a visual image of the field; obtaining labeled image data comprising furrows, furrow locations, and furrow directions in images of similar furrows; training a machine learning model to identify furrows, determine furrow locations, and determine furrow directions using the labeled image data; identifying a furrow by using the depth image and the visual image as inputs to the machine learning model; determining a furrow location and a furrow direction of the furrow by using the depth image and the visual image as inputs to the machine learning model.

In some aspects, identifying the furrow further comprises generating a segmentation map from the visual image. In some aspects, determining the furrow direction further comprises determining a center of the furrow from the depth image. In some aspects, determining the furrow location and the furrow direction further comprises determining location values and direction values for pixels of the visual image corresponding to the furrow.

In some aspects, the method further comprises determining a representative location and a representative direction based on the location values and the direction values, wherein the representative location corresponds to the furrow location and the representative direction corresponds to the furrow direction.

In various aspects, the present disclosure provides a method of navigating a field, the method comprising detecting a first furrow using a method as described herein, directing a vehicle along the first furrow, exiting the field along a field exit path, steering the vehicle using a system as described herein or a method of as described herein, re-entering the field along a field re-entry path at a second furrow detected using a method of as described herein, or a combination thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
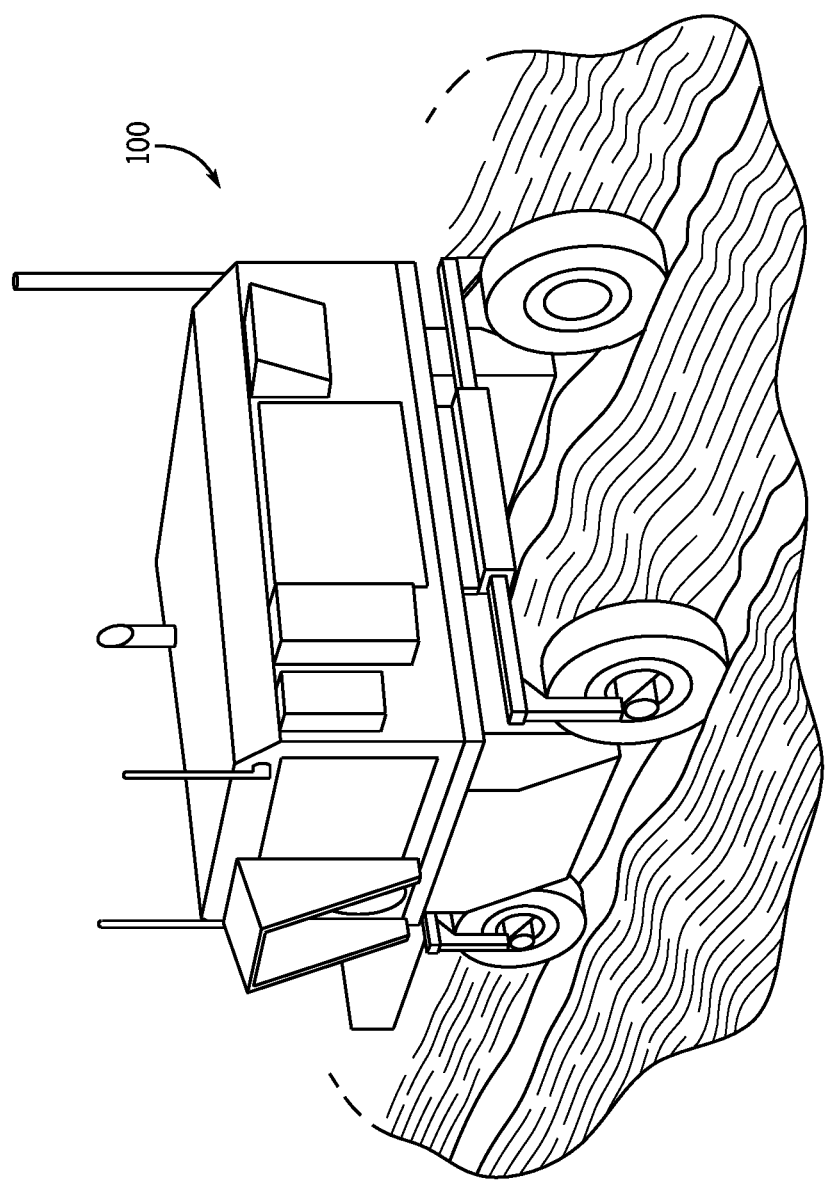
FIG. 1 illustrates an isometric view of an autonomous laser weed eradication vehicle, in accordance with one or more embodiments herein.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification.

Without intent to limit the scope of the disclosure, examples of instruments, apparatus, methods, and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Described herein are systems and methods for detecting and locating furrows in a field, such as an agricultural field. The systems and methods of the present disclosure may be used to determine parameters, such as position and angle, of a detected furrow while autonomously navigating along the furrow. For example, a self-driving farm vehicle, such as a tractor, a weeder, a planter, a harvester, or a sprayer may navigate along a crop furrow using the systems and methods described herein. A furrow detection method, as described herein, may be used to identify a furrow within an image collected by a sensor on a self-driving vehicle, and determine a position and direction of the furrow, enabling the self-driving vehicle to navigate along the furrow. These furrow detection methods may be implemented in real time and used to adjust a heading of the self-driving vehicle to continue following the furrow.

Also described herein are systems and methods for autonomously turning a vehicle at the end of a furrow within a designated turnaround area to begin navigating along a second furrow. The autonomous turning methods described herein may enable steering of a self-driving vehicle, such as a self-driving farm vehicle (e.g., a tractor, a weeder, a planter, a harvester, or a sprayer) within a narrow turnaround area. Furthermore, the autonomous turning methods may facilitate navigation of non-rectangular or irregularly shaped fields, such as center-pivot farms, in which furrows may not be positioned perpendicular to a field boundary, or in which relative placement of furrow ends is variable. Navigation points, also referred to herein as "positions", within the turnaround area may be determined based on field features, such as an inner boundary (e.g., an inner geofence or a boundary spaced a predetermined distance from an inner geofence), an outer boundary (e.g., an outer geofence or a boundary spaced a predetermined distance from an outer geofence), a position of a first furrow (e.g., a furrow that the self-driving vehicle is exiting), a position of a second furrow (e.g., a furrow that the self-driving vehicle is entering), a length of the self-driving vehicle, a width of the self-driving vehicle, a turning radius of the self-driving vehicle, or combinations thereof. In some embodiments, navigation points may be determined in real-time, for example as the vehicle exits or approaches the exit of the first furrow. Field features may be detected using sensors (e.g., cameras, GPS sensors, rotary encoders, and the like) located on or associated with the vehicle. Navigation points may be adjusted during execution of the turn, for example to account for terrain irregularity or deviations from an expected path or position. In some embodiments, a path to a navigation point may be determined, adjusted, or both in response to a vehicle location, velocity, heading, or trajectory, deviation from an expected location, velocity, heading, or trajectory, or combinations thereof.

As used herein, an "image" may refer to a representation of a region or object. For example, an image may be a visual representation of a region or object formed by electromagnetic radiation (e.g., light, x-rays, microwaves, or radio waves) scattered off of the region or object. In another example, an image may be a point cloud model formed by a light detection and ranging (LIDAR) or a radio detection and ranging (RADAR) sensor. In another example, an image may be a sonogram produced by detecting sonic, infrasonic, or ultrasonic waves reflected off of the region or object. As used herein, "imaging" may be used to describe a process of collecting or producing a representation (e.g., an image) of a region or an object.

As used herein a position, such as a position of an object or a position of a sensor, may be expressed relative to a frame of reference. Exemplary frames of reference include a surface frame of reference, a vehicle frame of reference, a sensor frame of reference, an actuator frame of reference, a three-dimensional geo-coordinate frame of reference, a two-dimensional surface coordinate frame of reference. Positions may be readily converted between frames of reference, for example by using a conversion factor or a calibration model. While a position, a change in position, or an offset may be expressed in a one frame of reference, it should be understood that the position, change in position, or offset may be expressed in any frame of reference or may be readily converted between frames of reference.

Autonomous Weed Eradication Systems

The detection and navigation methods described herein may be implemented by a self-driving vehicle (also referred to herein as an "autonomous vehicle") to navigate a field. For example, the detection and navigation methods may be implemented by an autonomous weed eradication system to navigate a field of crops while autonomously targeting and eliminating weeds. Such detection and navigation methods may facilitate steering of the vehicle along furrows to avoid driving over and damaging crops. For example, an autonomous weed eradication system may navigate along a crop furrow and, upon reaching the end of the furrow, turn around and begin navigating along a second furrow.

Figure 2:
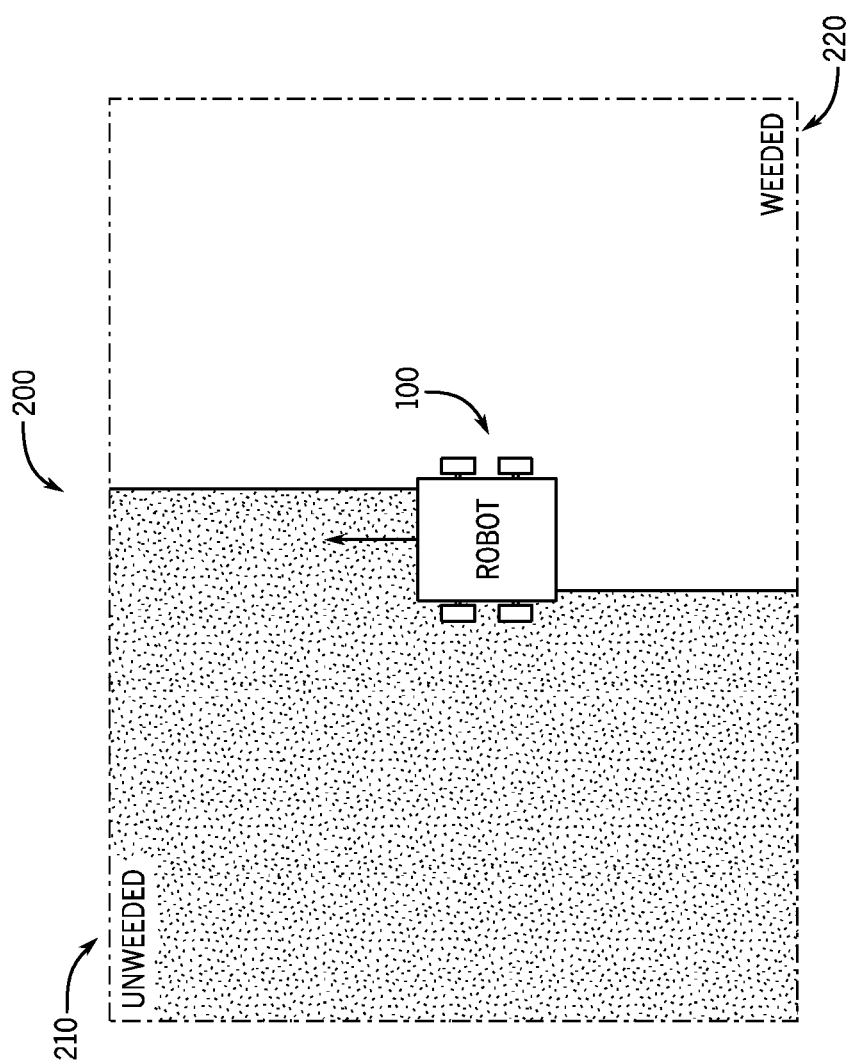
FIG. 2 illustrates a top view of an autonomous laser weed eradication vehicle navigating a field of crops while implementing various techniques described herein.

An autonomous weed eradication system may identify, target, and eliminate weeds without human input. Optionally, the autonomous weed eradication system may be positioned on a self-driving vehicle or a piloted vehicle or may be pulled by a vehicle such as a tractor. As illustrated in FIG. 1, an autonomous weed eradication system may be part of or coupled to a vehicle 100, such as a tractor or self-driving vehicle. The vehicle 100 may drive through a field of crops 200, as illustrated in FIG. 2. As the vehicle 100 drives through the field 200 it may identify, target, and eradicate weeds in an unweeded section 210 of the field, leaving a weeded field 220 behind it. In some embodiments, the speed of the vehicle may be adjusted based on one or more properties of the field (e.g., weed density, weed size, terrain texture, crop type, furrow placement, etc.). For example, a self-driving vehicle of an autonomous weed eradication system may travel at slower speeds when a weed density is high and at faster speeds when the weed density is low. Alternatively or in addition, the self-driving vehicle of the autonomous weed eradication system may travel at slower speeds when targeting and eradicating larger weeds and at faster speeds when targeting and eradicating smaller weeds. The detection and navigation methods described herein may be implemented by a self-driving vehicle, such as the autonomous weed eradication system or a vehicle coupled to the autonomous weed eradication system to navigate along furrows in a crop field. The high precision of such detection and navigation methods enables accurate navigation of fields, facilitating accurate targeting of weeds, such as with a laser, to eradicate the weeds in the field without damaging nearby crops.

Furrow Detection

Described herein are methods of detecting a furrow (e.g., a long, narrow trench in the ground). Furrows may be used to navigate a field, such as a crop field, by positioning the wheels of a vehicle in the furrows to avoid damaging crops planted in between the furrows. The furrow detection methods of the present disclosure may be used to detect furrows in real-time in images collected by a sensor coupled to a self-driving vehicle to navigate the vehicle along the furrows without pre-plotting locations of crop rows. A self-driving vehicle may comprise one or more forward navigation sensors positioned on the front of the vehicle. In some embodiments, a self-driving vehicle may further comprise one or more rear navigation sensors positioned on the rear of the vehicle. In some embodiments, a forward sensor or a reverse sensor may comprise a depth sensor (e.g., a depth camera or a LIDAR sensor) configured to generate a depth image. In some embodiments, the forward sensor or the reverse sensor may be a two-dimensional sensor (e.g., a two-dimensional camera) and the vehicle may further comprise one or more depth sensors (e.g., a depth camera or a LIDAR sensor) positioned on the front or rear of the vehicle. Trench-like features may facilitate detection of furrows in a depth map by using the shape of the furrow to identify the furrow center.

In some embodiments, a combination of machine learning (e.g., deep learning) and post-processing may be used to identify and locate furrows in an image. Machine learning may be implemented to generate a segmentation mask and a direction mask. A segmentation mask may contain pixel assignment data where pixels in the segmentation mask are designated as "furrow" or "background". A direction mask may contain pixel values corresponding to direction information for the corresponding furrow. For example, a pixel in a direction mask may contain $\cos(2\theta)$ and $\sin(2\theta)$ values, where $\theta$ represents the angle of the furrow relative to a reference coordinate system. In another example, a pixel in a direction mask may contain $\cos(\theta)$ and $\sin(\theta)$ values. In some embodiments, $\cos(2\theta)$ and $\sin(2\theta)$ values may be transformed into $\cos(\theta)$ and $\sin(\theta)$ values. In some embodiments, $\theta$ values may be limited to a half circle. For example, $\theta$ values may be from 0 to $\pi$ (i.e., 0° to 180°). In another example, $\theta$ values may be from $-\pi/2$ to $\pi/2$ (i.e., −90° to 90°).

Figure 9:
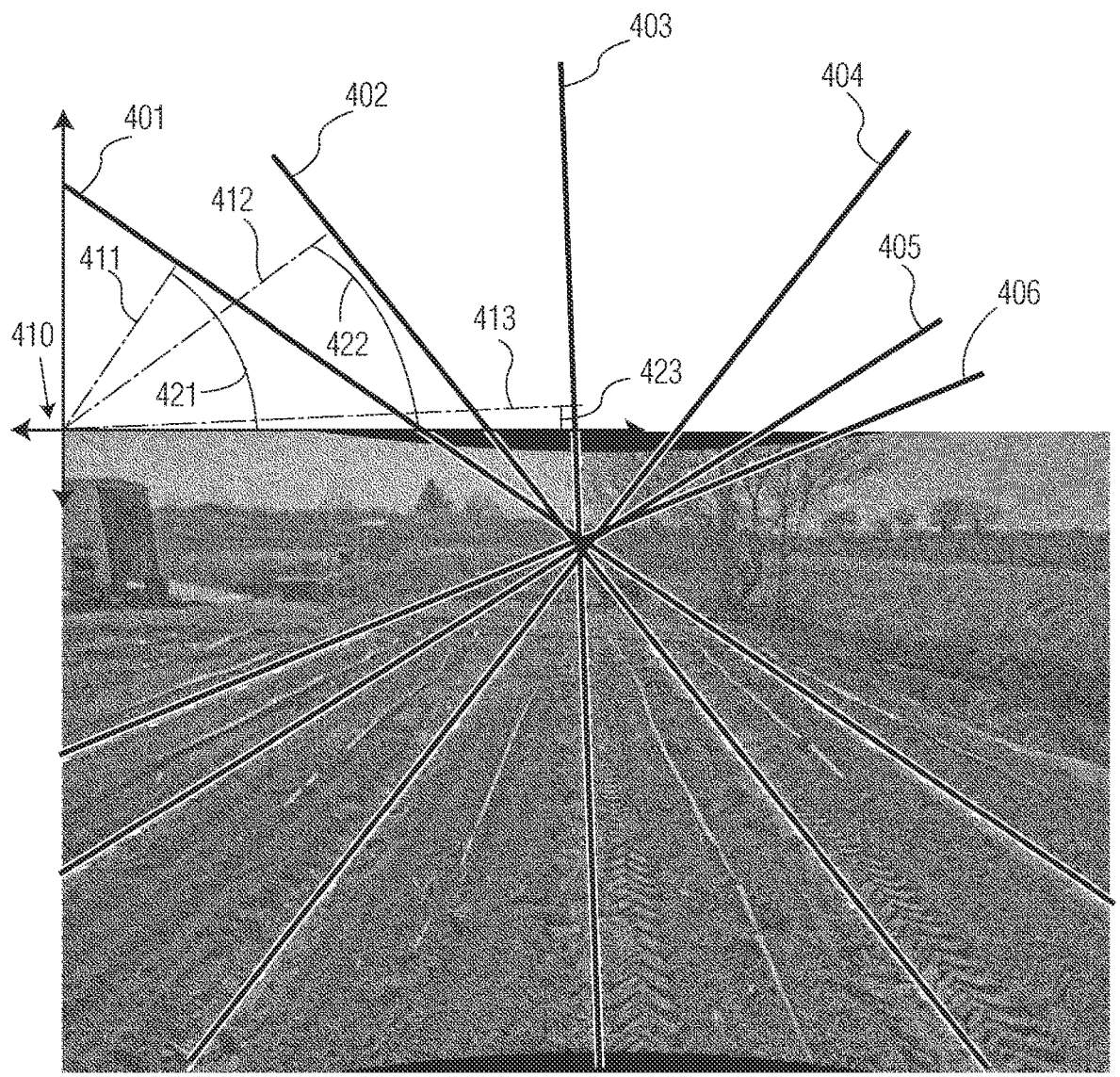
FIG. 9 schematically illustrates a method of furrow detection, in accordance with one or more embodiments herein.

In some embodiments, furrow parameters may be expressed in polar coordinates relative to a reference point (e.g., an origin) and a reference coordinate system. As illustrated in FIG. 9, furrows location and direction may be expressed in terms of $\rho$ and $\theta$ values, respectively. Furrow lines 401, 402, 403, 404, 405, and 406 may be used to represent a first furrow, a second furrow, a third furrow, a fourth furrow, a fifth furrow, and a sixth furrow, respectively. Lines 411, 412, 413, 414, 415, and 416 representing $\rho$ values for the first furrow, the second furrow, the third furrow, the fourth furrow, the fifth furrow, and the sixth furrow may be drawn from an origin point 410 of a coordinate system to intersect furrow lines 401, 402, 403, 404, 405, and 406, at right angles. The length of lines 411, 412, 413, 414, 415, and 416 represent the $\rho$ values for the corresponding furrows. Angles 421, 422, 423, 424, 425, and 426, representing $\theta$ values for the first furrow, the second furrow, the third furrow, the fourth furrow, the fifth furrow, and the sixth furrow, respectively, may be determined relative to the coordinate system. In some embodiments, $\theta$ may be from 0 $\pi$. In some embodiments, $\rho$ may be positive or negative depending on the location of the furrow relative to the origin. In FIG. 9, the top left corner of the image is used as the origin 410. However, the origin may be any point. For example, the origin 410 may be the top right corner, the bottom right corner, the bottom left corner, the center, or any other point. In some embodiments, $\rho$ and $\theta$ values, $\cos(2\theta)$ and $\sin(2\theta)$ values, or $\cos(\theta)$ and $\sin(\theta)$ values may be determined using machine learning methods.

Figure 10:
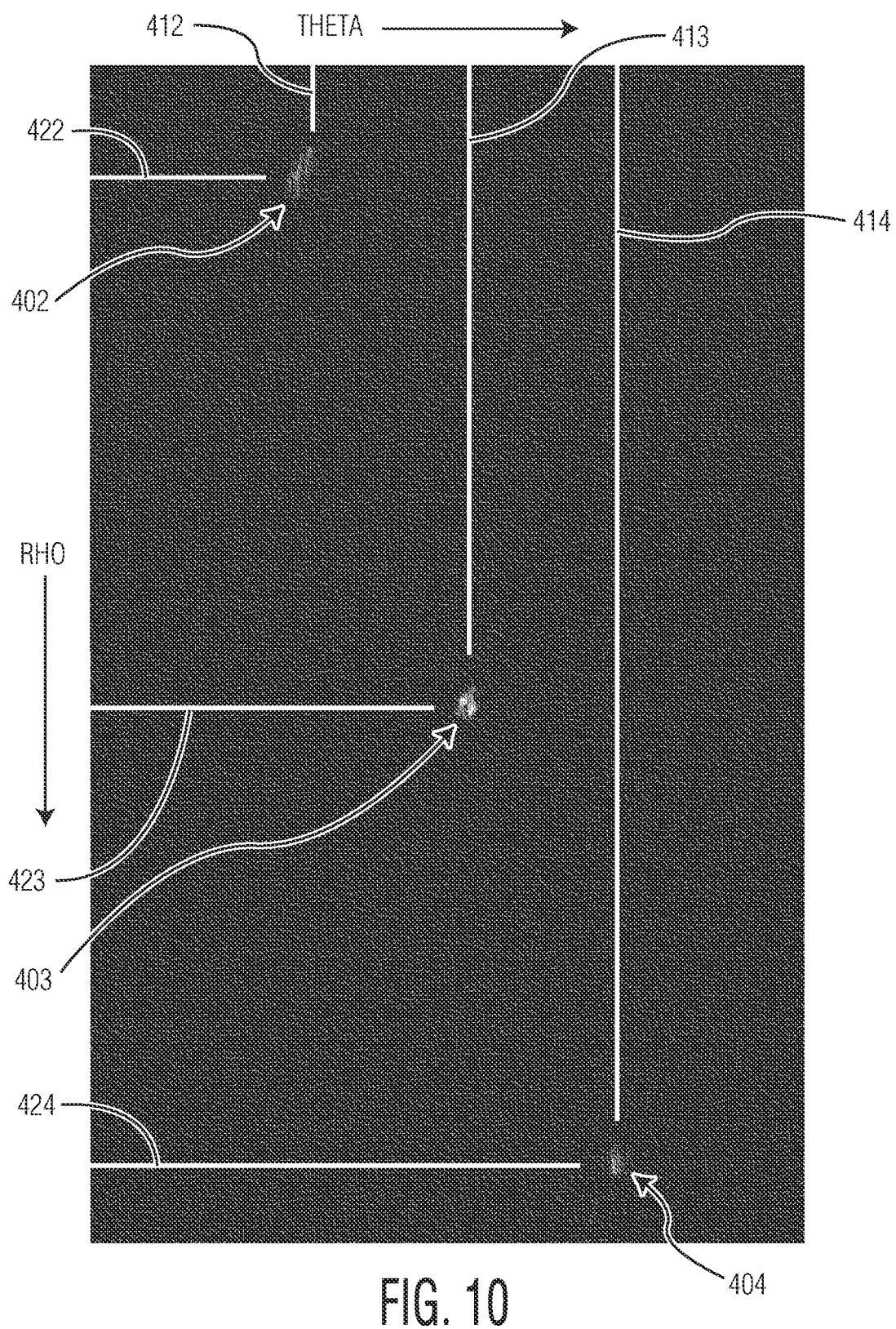
FIG. 10 illustrates a Hough map with detected furrows generated using a method of furrow detection, in accordance with one or more embodiments herein.

A Hough transform may be used to generate a Hough map from $\cos(\theta)$ and $\sin(\theta)$ values and x and y coordinates of the furrow relative to a reference point (e.g., the origin). The $\cos(\theta)$, $\sin(\theta)$, x, and y values may be determined from a direction map, a segmentation map, or a combination thereof. In some embodiments, the Hough transform may comprise identifying minimum and maximum $\rho$ values and minimum and maximum $\theta$ values. In some embodiments, $\cos(\theta)$ and $\sin(\theta)$ to $\rho$ and $\theta$ are plotted on a Hough map. An example of a Hough map containing data from furrow lines 402, 403, and 404 is shown in FIG. 10. Rho ($\rho$) values 412, 413, and 414 may be plotted on a first axis, and theta ($\theta$) values 422, 423, and 424 may be plotted on a second axis. Data from the Hough map may be clustered, blurred, or otherwise grouped to identify and group components corresponding to the same furrow. For example, a gaussian blur may be applied or a clustering technique such as DB SCAN may be used. Representative values for the grouped components may be used to determine $\rho$ and $\theta$ values for the corresponding furrow. For example, the representative values may be means, medians, centers of mass, maxima, or other representative values.

Figure 11:
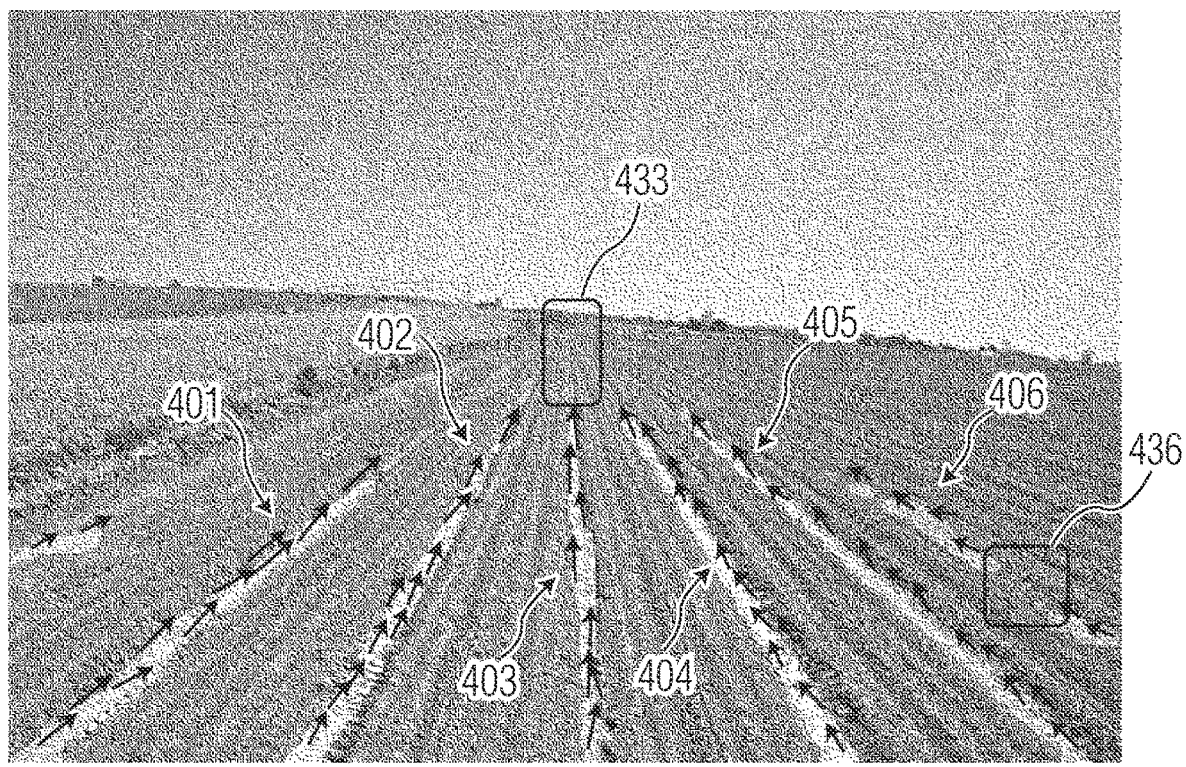
FIG. 11 illustrates a furrow segmentation mask containing gaps and incomplete furrows.

Furrow detection methods using a segmentation mask alone may result in incomplete furrow detection, such as gaps in or truncations of the furrow. For example, as shown in FIG. 11, a furrow segmentation mask may contain a gap 436 or an early termination 433. In some embodiments, a method of furrow detection may use furrow line clustering to generate a representative furrow and generate a furrow prediction along the length of the furrow. A representative furrow may be generated by predicting direction values for a furrow, applying a Hough transform, and identifying a representative value (e.g., by blurring or clustering the Hough transform data). In some embodiments, furrow line clustering may be used in combination with a segmentation mask for improved furrow detection. Furrow predictions may be validated by using a mask in combination with predictions of $\sin(2\theta)$ and $\cos(2\theta)$ of individual furrow pixels in an image. FIG. 11 illustrates a segmentation mask (shaded region) for furrow lines 401, 402, 403, 404, 405, and 406 overlayed with examples of unit vectors (arrows) resulting from individual pixel predictions. Values may be determined for each furrow pixel, corresponding to the shaded regions. As seen in FIG. 11, the determined values for pixels within the same furrow may not be aligned.

Parameters, such as ρ and θ values, may be assigned to each furrow in an image collected by a sensor or pair of sensors (e.g., a pair of forward sensors or a pair of rear sensors). The furrow parameters may be used to navigate a self-driving vehicle along a furrow. For example, the self-driving vehicle may navigate along a central furrow or a furrow positioned closest to one of the sensors. In some embodiments, images may be collected in series to detect and navigate furrows in real time.

Machine Learning Models for Furrow Detection

A furrow detection method may be implemented by a furrow detection module configured to identify and locate furrows in an image, for example an image collected by a sensor coupled to a self-driving vehicle. In some embodiments, the furrow detection module may be in communication with a vehicle navigation system to navigate the vehicle along the furrow. The furrow detection module may implement one or more machine learning algorithms or networks that are implemented and dynamically trained to identify and locate furrows within one or more images (e.g., a first image, a second image, a depth image, etc.). The one or more machine learning algorithms or networks may include a neural network (e.g., convolutional neural network (CNN), deep neural network (DNN), etc.), geometric recognition algorithms, photometric recognition algorithms, principal component analysis using eigenvectors, linear discrimination analysis, You Only Look Once (YOLO) algorithms, hidden Markov modeling, multilinear subspace learning using tensor representation, neuronal motivated dynamic link matching, support vector machine (SVMs), or any other suitable machine learning technique. If the furrow detection module implements one or more neural networks for furrow detection, these one or more neural networks may include one or more convolutional layers, vision transformer layers, or a combination thereof. The furrow detection module may comprise a system controller, for example a system computer having storage, random access memory (RAM), a central processing unit (CPU), and a graphics processing unit (GPU). The system computer may comprise a tensor processing unit (TPU). The system computer should comprise sufficient RAM, storage space, CPU power, and GPU power to perform operations to identify and locate a furrow.

Figure 12:
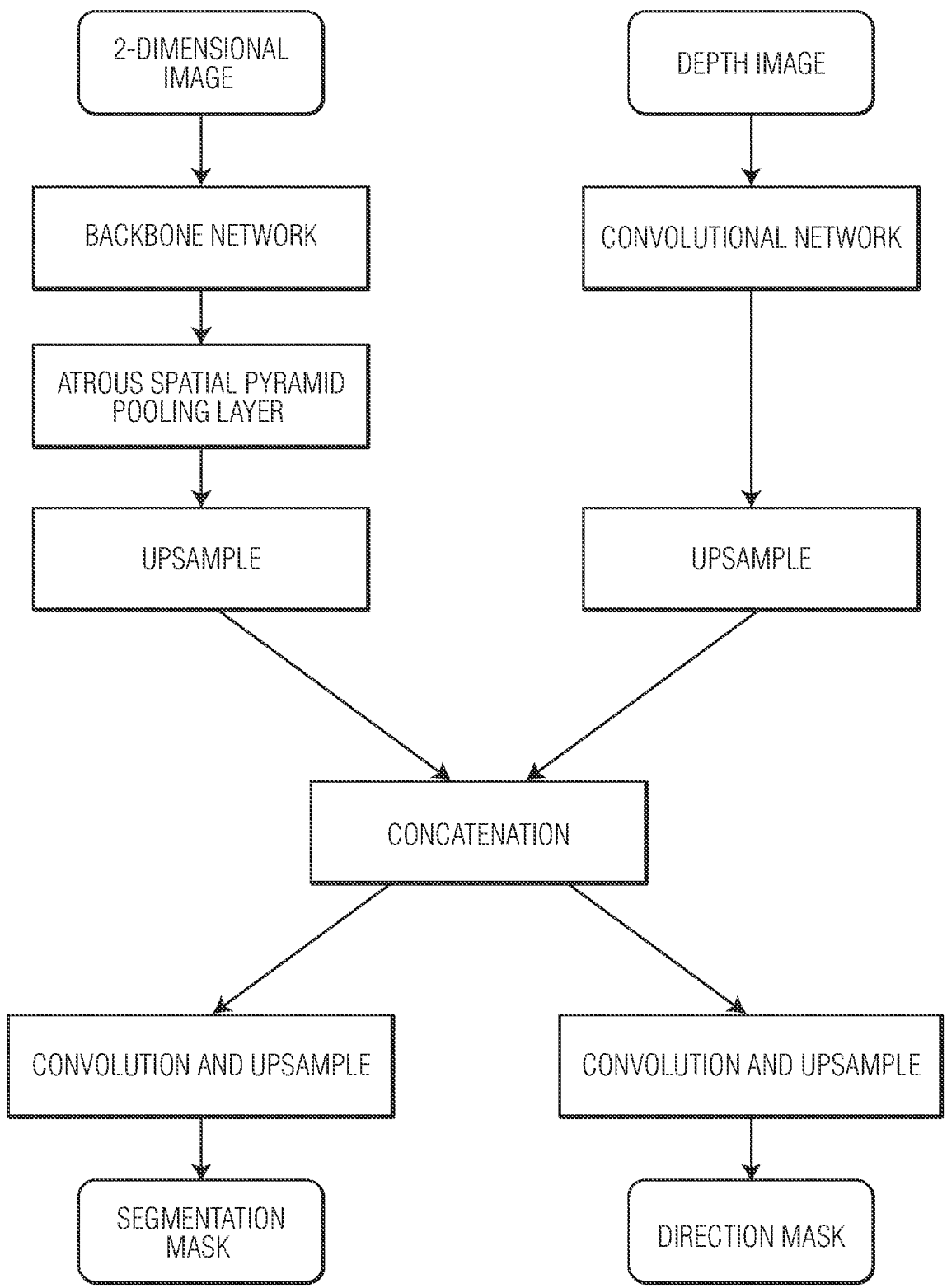
FIG. 12 schematically illustrates a machine learning model architecture for furrow detection, in accordance with one or more embodiments herein.

The furrow detection machine learning model may be trained using a sample training dataset of images, for example images of fields with one or more furrows. The training images may be labeled with one or more furrow parameters, such as furrow identity (e.g., pixels corresponding to furrow, pixels corresponding to background, groups of pixels corresponding to the same furrow, etc.), furrow position (e.g., position of the furrow relative to a reference point), furrow direction (e.g., angle of the furrow relative to a reference coordinate system), or combinations thereof. In some embodiments, the one or more machine learning algorithms implemented by the furrow detection module may be trained end-to-end (e.g., by training multiple parameters in combination). Alternatively, or in addition, subnetworks (e.g., direction networks) may be trained independently. For instance, these subnetworks may be trained using supervised, unsupervised, reinforcement, or other such training techniques as described above. An example of a model architecture for a furrow detection module is provided in FIG. 12. As illustrated in FIG. 12, furrow detection may comprise two processes: a first process to generate a segmentation mask, and a second process to generate a direction mask.

In the first process, an image (e.g., an image collected by a sensor coupled to a self-driving vehicle) may be received by a backbone network. In some embodiments, the image may be an RGB color image of a surface (e.g., a field). The network may be a CNN, including any number of nodes (e.g., neurons) organized in any number of layers, or the network may be built using vision transformers or visual transformers. In some embodiments, the convolutional neural network may comprise an input layer configured to receive the image, an identification layer configured to identify furrows in the image, and an output layer configured to output data (e.g., feature maps, segmentation masks, number of furrows, locations of furrows, etc.). In some embodiments, the convolutional network may comprise of an input layer which receives an image, a series of hidden layers, and one or more output layers. The outputs layer may output a result of the network, such as furrow location. Each layer of the convolutional neural network may be connected by any number of additional hidden layers. For example, a convolutional network may comprise an input layer which receives an image, a series of hidden layers, and one or more output layers. Each of the hidden layers may perform a convolution over the image and output feature maps. The feature maps may be passed from the hidden layer to the next convolutional layer. The outputs layer may output a result of the network, such as furrow location. In some embodiments, the output may be a multi-resolution output.

The backbone network may receive an image via an input layer. In some embodiments, the backbone may comprise a pre-trained network (e.g., ResNet50, MobileNet, CBNetV2, etc.) or a custom trained network. The backbone may comprise a series of convolution layers, dropout, activation functions, pooling, batch normalization, vision transformers, visual transformers, other deep learning mechanisms, or combinations thereof that may be organized into residual blocks. The backbone network may process, as input, an image to produce an output that may be fed into the rest of the machine learning network. For example, the output may comprise one or more feature maps comprising features of the input image via an output layer.

An output of the backbone network (e.g., a feature map) may be received by one or more additional networks or layers configured to identify one or more furrow parameters, such as number of furrows, furrow identity, furrow location, or combinations thereof. In some embodiments, a network or layer may be configured to evaluate a single parameter. In some embodiments, a network or layer may be configured to evaluate two or more parameters. In some embodiments, the parameters may be evaluated by a single network or layer. In some examples, an output of the backbone network (e.g., a feature map) may be received by an Atrous Spatial Pyramid Pooling (ASPP) layer. The ASPP layer may apply a series of atrous convolutions to the output of the backbone network. In some embodiments, the outputs of the atrous convolutions may be pooled and provided to a subsequent network layer of the point detection model. In some embodiments, the output may be a segmentation mask, a direction mask, or both.

An interpolation may be applied to the output of the additional network (e.g., the ASPP layer) to upsample the output to match the height and width of an interim layer from the second process. In some embodiments, the interpolation may be a bilinear interpolation or a nearest neighbor interpolation. The upsampled output from the first process may be concatenated together with the output of the second process in a concatenation layer. The concatenation layer may stack the output tensors of upsample layers from both the first process and the second process.

The concatenated output may be received by a convolution and upsample network. The convolution portion of the convolution and upsample network may comprise a series of one or more convolutional neural networks running in parallel. In some embodiments, each convolutional neural network may contain a series of convolution layers, dropout, activation functions, pooling, batch normalization, vision transformers, visual transformers, other deep learning mechanisms, or combinations thereof that may be organized into residual blocks. The output of the convolution network may include a slice for each identity class (furrow, background, etc.) and may be upsampled using an interpolation (e.g., a bilinear interpolation) to match to the height and width of the input image. An activation function (e.g., a sigmoid activation function, a softmax activation function, a step activation function, linear activation function, hyperbolic tangent activation function, Rectified Linear Unit (ReLU) activation function, swish activation function, etc.) may be applied to each pixel of this output upsampled image.

In the second process, a depth image (e.g., an image containing three-dimensional information) may be received by a convolutional network. In some embodiments, the depth image may be generated from two images of a surface (e.g., a field) collected from different angles. The network may be a backbone network. The network may be a CNN, including any number of nodes (e.g., neurons) organized in any number of layers, or the network may be built using vision transformers or visual transformers. In some embodiments, the convolutional neural network may comprise an input layer configured to receive the image, an identification layer configured to identify furrows in the image, and an output layer configured to output data (e.g., feature maps, segmentation masks, number of furrows, locations of furrows, etc.). Each layer of the convolutional neural network may be connected by any number of additional hidden layers. For example, a convolutional network may comprise of an input layer which receives an image, a series of hidden layers, and one or more output layers. Each of the hidden layers may perform a convolution over the image and output feature maps. The feature maps may be passed from the hidden layer to the next convolutional layer. The outputs layer may output a result of the network, such as a direction mask. In some embodiments, the output may be a multi-resolution output.

The convolutional network may receive a depth image via an input layer. In some embodiments, the convolutional network may comprise a pre-trained network (e.g., ResNet50, MobileNet, CBNetV2, etc.) or a custom trained network. The convolutional network may comprise a series of convolution layers, dropout, activation functions, pooling, batch normalization, vision transformers, visual transformers, other deep learning mechanisms, or combinations thereof that may be organized into residual blocks. The convolutional network may process, as input, a depth image to produce an output that may be fed into the rest of the machine learning network. For example, the output may comprise one or more feature maps comprising features of the input image via an output layer.

An interpolation may be applied to an output of the backbone network (e.g., a feature map) to upsample the output to match the height and width of an interim layer from the first process. In some embodiments, the interpolation may be a bilinear interpolation. The upsampled output from the second process may be concatenated together with the output of the first process in a concatenation layer. The concatenation layer may stack the output tensors of upsample layers from both the first process and the second process.

The concatenated output may be received by a convolution and upsample network. The convolution portion of the convolution and upsample network may comprise a series of one or more convolutional neural networks running in parallel. In some embodiments, each convolutional neural network may contain a series of convolution layers, dropout, activation functions, pooling, batch normalization, vision transformers, visual transformers, other deep learning mechanisms, or combinations thereof that may be organized into residual blocks. The output of the convolution network may include two slices for each identity class (furrow, background, etc.). The first slice for each class may predict a first value corresponding to a furrow position and direction, and the second slice for each class may predict a second value corresponding to the furrow position and direction. In some embodiments, the first value and the second value may be related to the position and direction of the furrow in a polar coordinate system. For example, the first value may be a $\cos(2\theta)$ value, and the second value may be a $\sin(2\theta)$ value, where $\theta$ corresponds to an angle of the furrow relative to a reference coordinate frame. The slices may be upsampled using an interpolation (e.g., a bilinear interpolation) to match to the height and width of the input image. An activation function (e.g., a sigmoid activation function, a softmax activation function, a step activation function, linear activation function, hyperbolic tangent activation function, Rectified Linear Unit (ReLU) activation function, swish activation function, etc.) may be applied to each pixel of this output upsampled image. The output of the function may have a range of −1 to 1, inclusive. In some embodiments, pixel values may be normalized across the first and second slices for each class such that the sum of $\cos(2\theta)^2$ and $\sin(2\theta)^2$ for each pixel is 1. In some embodiments, furrow positions and directions may be expressed as Cartesian coordinates (e.g., x, y, and/or z coordinates) relative to a reference point in the image (e.g., an edge of the image, a center of the image, or a grid line within the image). In some embodiments, point locations may be expressed as polar, spherical, or cylindrical coordinates (e.g., $\theta$, $\rho$, and/or $\varphi$ (spherical) or z (cylindrical) coordinates) relative to a reference point in the image (e.g., an edge of the image, a center of the image, or a polar grid line within the image).

The machine learning processes described herein may be used to detect furrows in images collected by a sensor coupled to a self-driving vehicle and to determine positions and directions of the furrows relative to the vehicle. The self-driving vehicle may use the outputs of a machine learning process to navigate along a furrow.

End of Row Turnaround

Described herein are navigation systems and methods for turning a vehicle within a designated turnaround area. The navigation systems and methods of the present disclosure may be used to execute an end-of-row turnaround of a vehicle exiting a field along a first path (e.g., a first furrow) to position the vehicle to re-enter the field along a second path (e.g., a second furrow). These navigation systems and methods may facilitate driving a self-driving farming vehicle (e.g., a tractor, a weeder, a sprayer, or a planter) up and down crop rows and may be used to turn the self-driving vehicle within a confined turnaround area.

Figure 3:
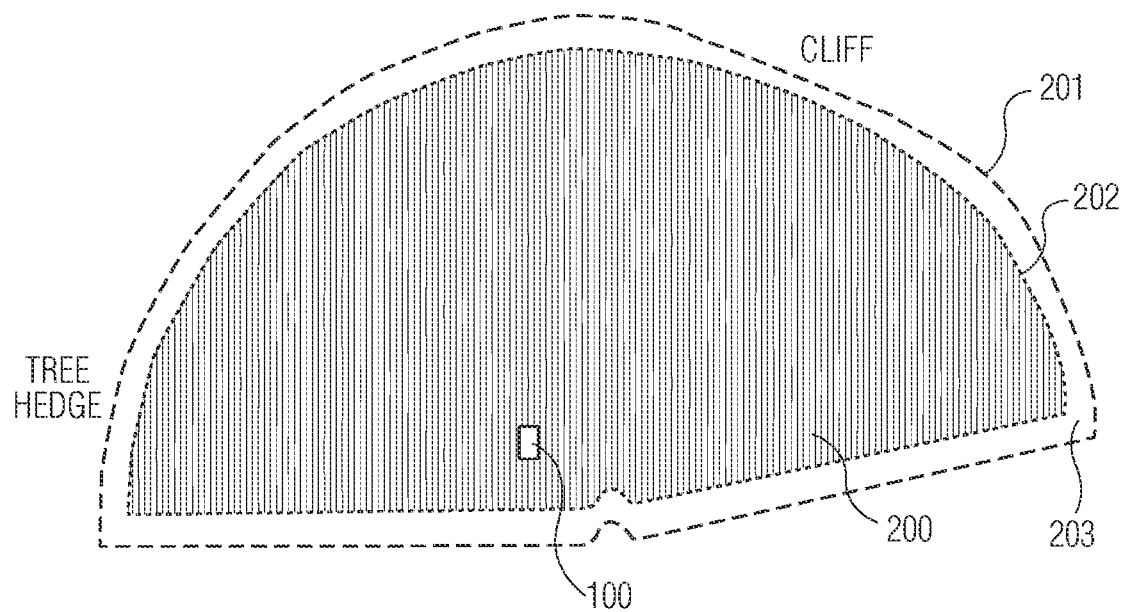
FIG. 3 illustrates an overhead view of a field in which various techniques described herein may be implemented.

FIG. 3 illustrates an example of a field 200 that may be navigated with a self-driving vehicle 100 using the systems and methods of the present disclosure. An inner boundary 202 may be designated around a field (e.g., a crop field). In some embodiments, the inner boundary 202 may be designated around a region in a field, such as a planted region or a region to be planted. An outer boundary 201 may represent the available navigation area. The outer boundary may encompass the inner boundary 202 and a turnaround area 203 surrounding the inner boundary 202. The outer boundary may be limited by terrain features, such as cliffs, trees, hedges, roads, or walls that may damage the vehicle if it crosses the outer boundary 201. In some embodiments, the inner boundary, the outer boundary, or both may be a geofence comprising GPS coordinates denoting the boundary. In some embodiments, the inner boundary, the outer boundary, or both may be a boundary at a predetermined distance from a geofence comprising GPS coordinates. For example, an outer boundary may be spaced about one vehicle length from an outer geofence or at least one vehicle length from an outer geofence to prevent exceeding the outer geofence. The inner boundary, the outer boundary, or both may comprise a curvilinear shape, due to an irregular field shape, such as a center-pivot farm.

Figure 4:
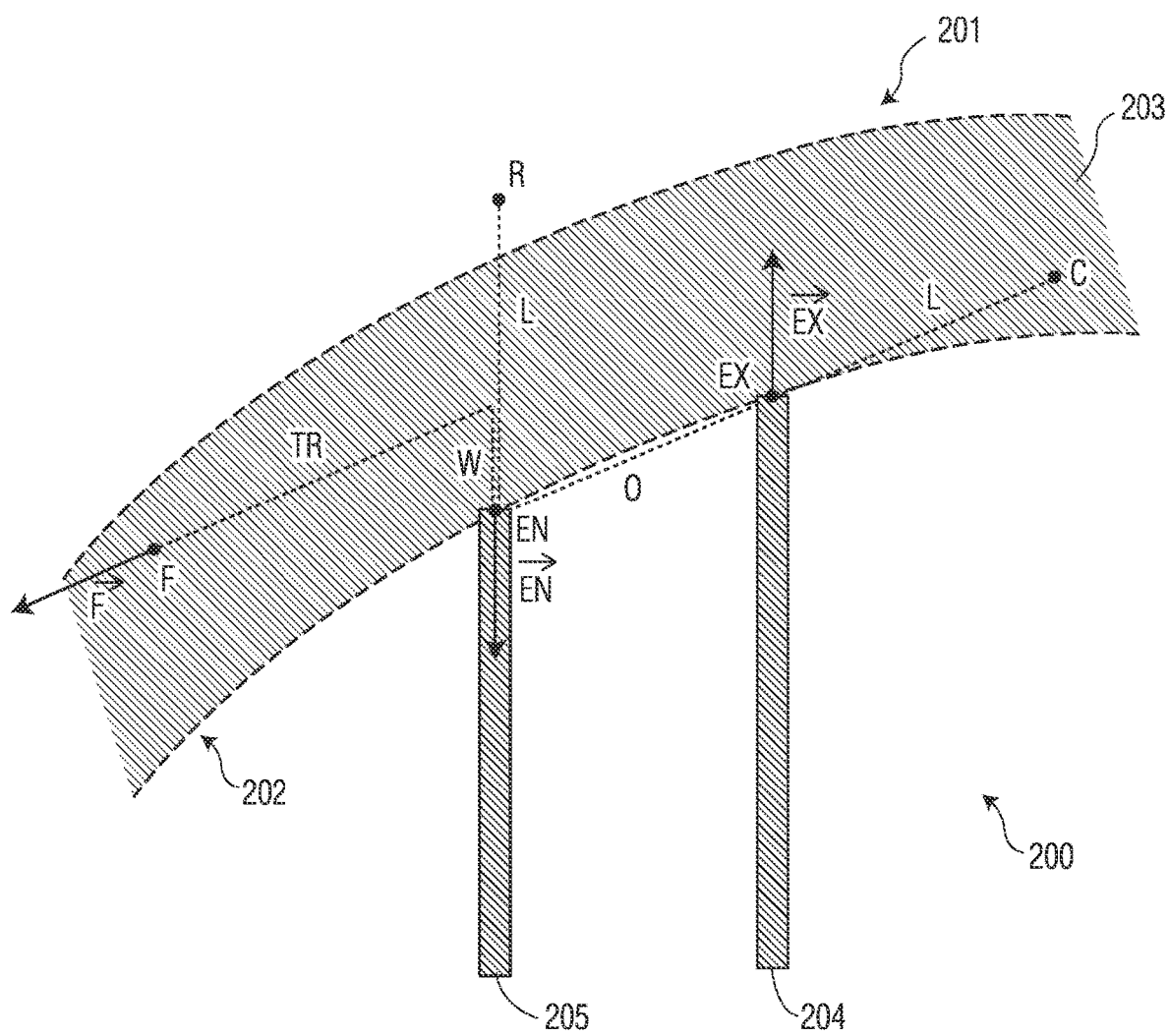
FIG. 4 schematically illustrates an exemplary end of row turnaround, in accordance with one or more embodiments herein.

FIG. 4 illustrates features that may be used to autonomously execute an end-of-row turnaround. A vehicle may exit a field 200 along a field exit path $\overrightarrow{EX}$ into a turnaround area 203 bound by an outer boundary 201 and an inner boundary 202. The field exit path $\overrightarrow{EX}$ may be along a first furrow 204, or the field exit path $\overrightarrow{EX}$ may be parallel to the first furrow 204. The vehicle may turn around such that it re-enters the field 200 along a field re-entry path $\overrightarrow{EN}$. The field re-entry path $\overrightarrow{EN}$ may be along a second furrow 205, or the field exit path $\overrightarrow{EX}$ may be parallel to the second furrow 205. Navigation target positions may be determined based on the field exit path $\overrightarrow{EX}$, the field re-entry path $\overrightarrow{EN}$, and the available turnaround area 203 along with vehicle parameters such as the vehicle width W, length L, and turning radius TR. A forward target position F may be designated based on the vehicle width W, the vehicle turning radius TR, and an offset trajectory O between the field exit path $\overrightarrow{EX}$ and the field re-entry path $\overrightarrow{EN}$. For example, the forward position F may be positioned at least one vehicle width W from the field re-entry position EN in a direction opposite the field re-entry path $\overrightarrow{EN}$ and at least one vehicle turning radius TR from the field re-entry position EN in a direction parallel to the offset trajectory O. A forward heading $\hat{F}$ may be parallel to the offset trajectory O. A correction position C may be used if there is insufficient space to reach the forward position F without encountering the outer boundary 201. The correction position C may be designated based on a vehicle length L. For example, the correction position C may be positioned at least one vehicle length L from the field exit position EX in a direction opposite the offset trajectory O. A reverse target position R may be designated based on a vehicle length L. For example, the reverse target position R may be positioned at least one vehicle length L from the field re-entry position EN in a direction opposite the field re-entry path $\overrightarrow{EN}$. The reverse position R may be inside the turnaround area 203, or the reverse position R may be outside the outer boundary 201.

Examples of turns are described herein. While specific examples are provided, there are numerous variations that may be performed. For example, a turn may be performed to the left or to the right. Multiple turns may be performed in series to navigate a field. Turns and corresponding reference points may be determined based on furrow and boundary locations as the vehicle is navigating the field. For example, a reference point may be determined as the vehicle is exiting a furrow. In some embodiments, a reference point may be adjusted as a turn is being executed. In some embodiments, reference points may be determined using field features detected using sensors (e.g., cameras, GPS sensors, rotary encoders, and the like) located on or associated with the vehicle. Reference points may be determined based on one or more vehicle parameters (e.g., width, length, turning radius, etc.) and may include an additional margin to allow for error. For example, a parameter may include additional margin to account for oversteering or understeering.

A steering path may be determined to reach a target position, a target heading, or both. Determining a steering path may comprise calculating a path to the target position or heading (also referred to as a "trajectory") and determining a wheel direction to following the path. In some embodiments, a steering path may be determined using a Bezier curve or other curve model. In some embodiments, the curve may be determined as the turn is executed. In some embodiments, the curve may be updated as the turn is executed, and the wheel angle may be adjusted. In some embodiments, a steering path may be determined to adjust the position of the vehicle if the vehicle strays from a target position or heading. A wheel direction may be determined based on an initial position (e.g., a current position of a vehicle), a final position (e.g., a target position), and an angle between an initial heading (e.g., a current heading of the vehicle) and a final heading (e.g., a target heading at the target position). For example, a wheel position may be calculated as follows:

$$P3=0.5625(P1)+0.375(P2)+0.0625(P2-(V2 \cdot D \cdot 0.5 \cdot \sin \Theta))$$

wherein P3 is a point at which the wheels are pointed, P1 is the initial position, P2 is the target position, V1 is the initial heading, V2 is the final heading, Θ is the angle between the initial heading and the final heading, and D is the distance between the initial position and the final position.

Figure 5:
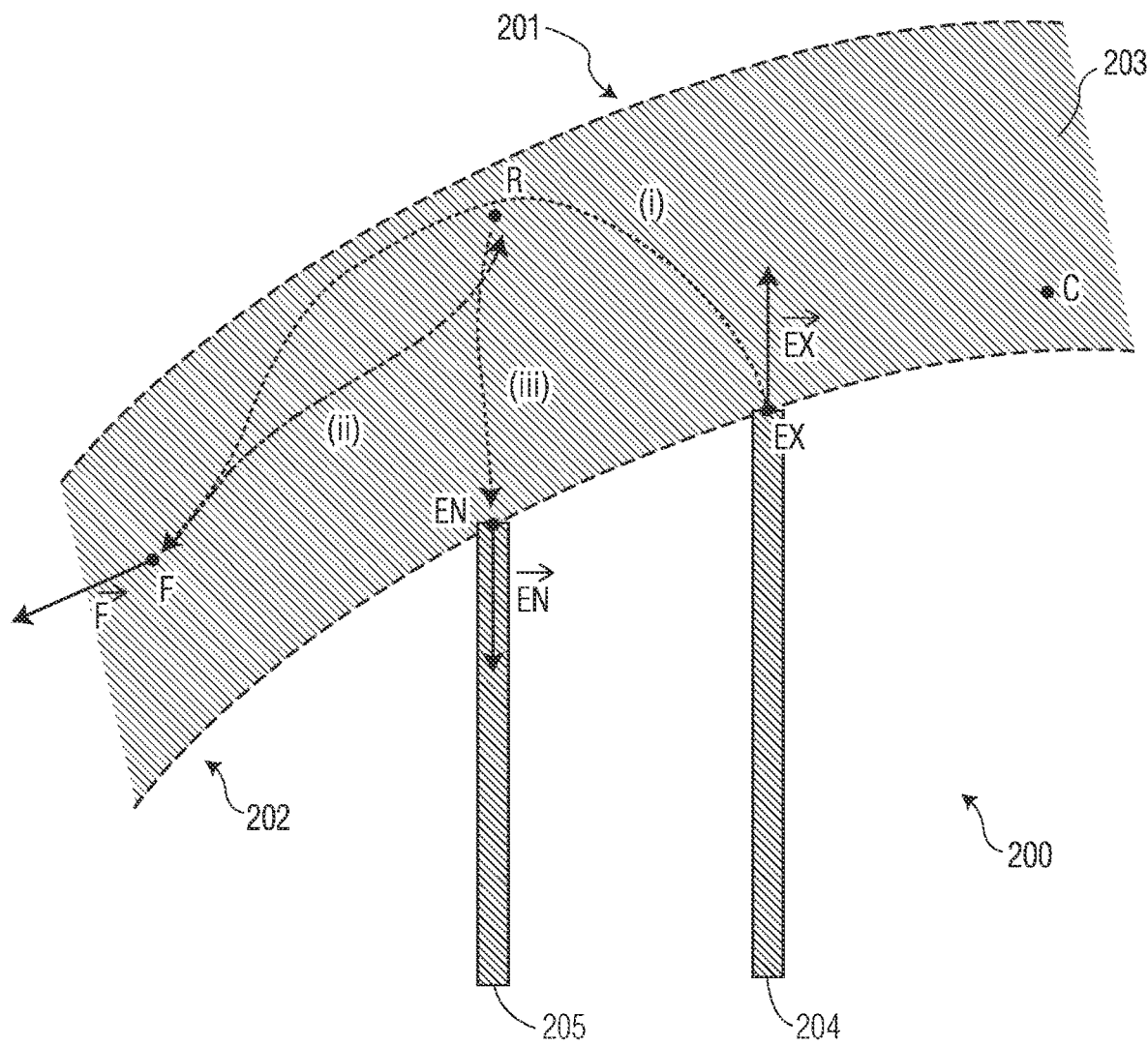
FIG. 5 schematically illustrates an exemplary end of row turnaround, in accordance with one or more embodiments herein.

FIG. 5 illustrates a turn performed without utilizing the correction position C. A vehicle is traveling along or parallel to a first furrow 204 and exits a field 200 along a field exit path $\overrightarrow{EX}$. Upon reaching the field exit position EX positioned on the inner boundary 202, the vehicle steers along path (i) toward the forward position F. The vehicle reaches the forward position F pointing at a forward heading $\hat{F}$. The vehicle then reverses along path (ii) toward the reverse position R. Upon reaching the reverse position R, the vehicle drives forward along path (iii) to the field re-entry position EN and reaches the field re-entry position EN positioned on the inner boundary 202 at a heading directed along the field re-entry path $\overrightarrow{EN}$. The vehicle then proceeds to travel along or parallel to a second furrow 205.

Figure 6:
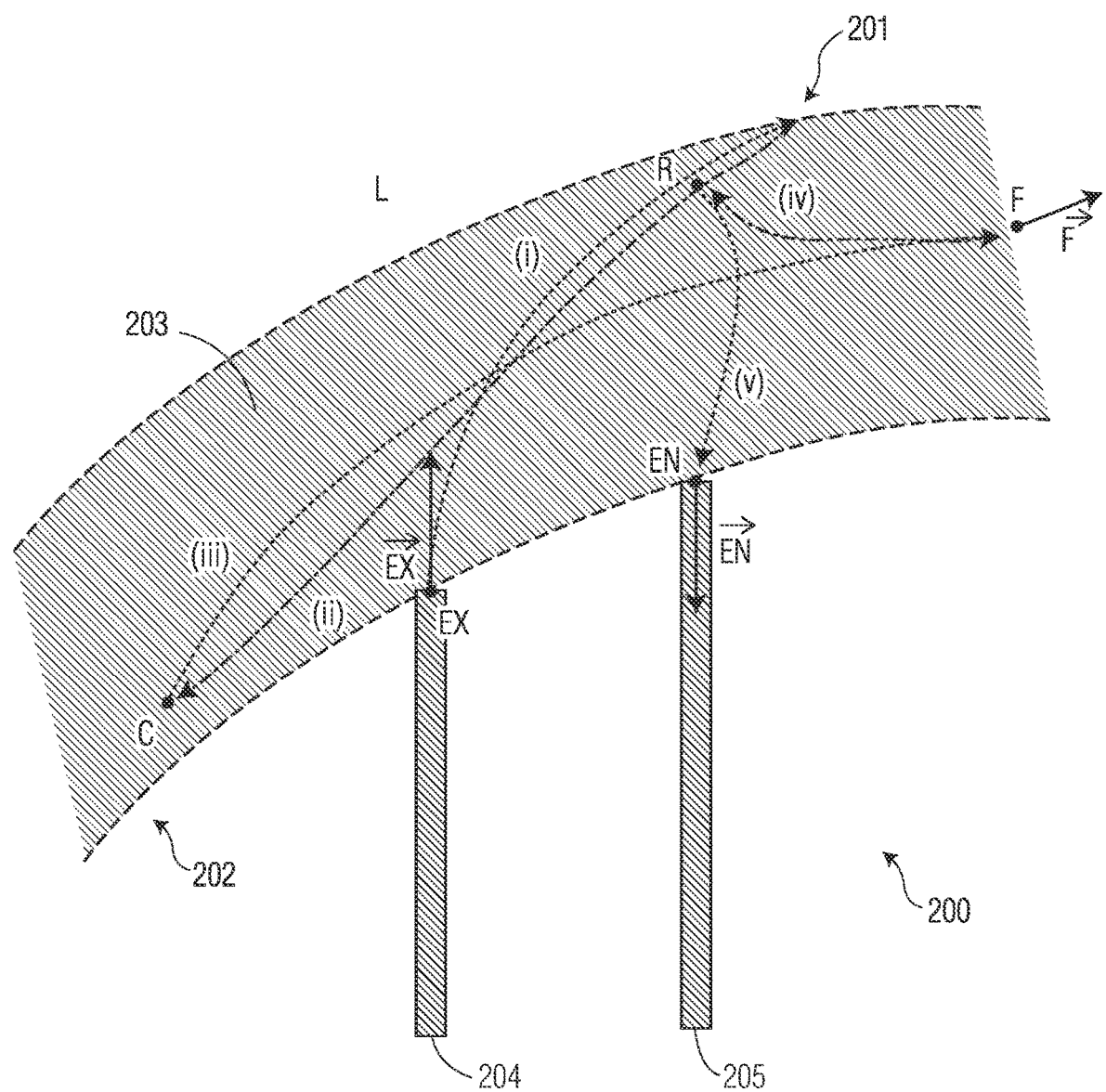
FIG. 6 schematically illustrates an exemplary end of row turnaround, in accordance with one or more embodiments herein.

FIG. 6 illustrates a turn performed using the correction position C. A vehicle is traveling along or parallel to a first furrow 204 and exits a field 200 along a field exit path $\overrightarrow{EX}$. Upon reaching the field exit position EX positioned on the inner boundary 202, the vehicle steers along path (i) toward the forward position F. The vehicle encounters the outer boundary 201 before reaching the forward position F. Upon encountering the outer boundary 201, the vehicle reverses toward the correction position C along path (ii). At the correction position C, the vehicle drives forward along path (iii) toward the forward position F. The vehicle reaches the forward position F pointing at a forward heading $\hat{\text{F}}$. The vehicle then reverses along path (iv) toward the reverse position R. Upon reaching the reverse position R, the vehicle drives forward along path (v) to the field re-entry position EN and reaches the field re-entry position EN positioned on the inner boundary 202 at a heading directed along the field re-entry path $\overrightarrow{\text{EN}}$. The vehicle then proceeds to travel along or parallel to a second furrow 205.

Figure 7:
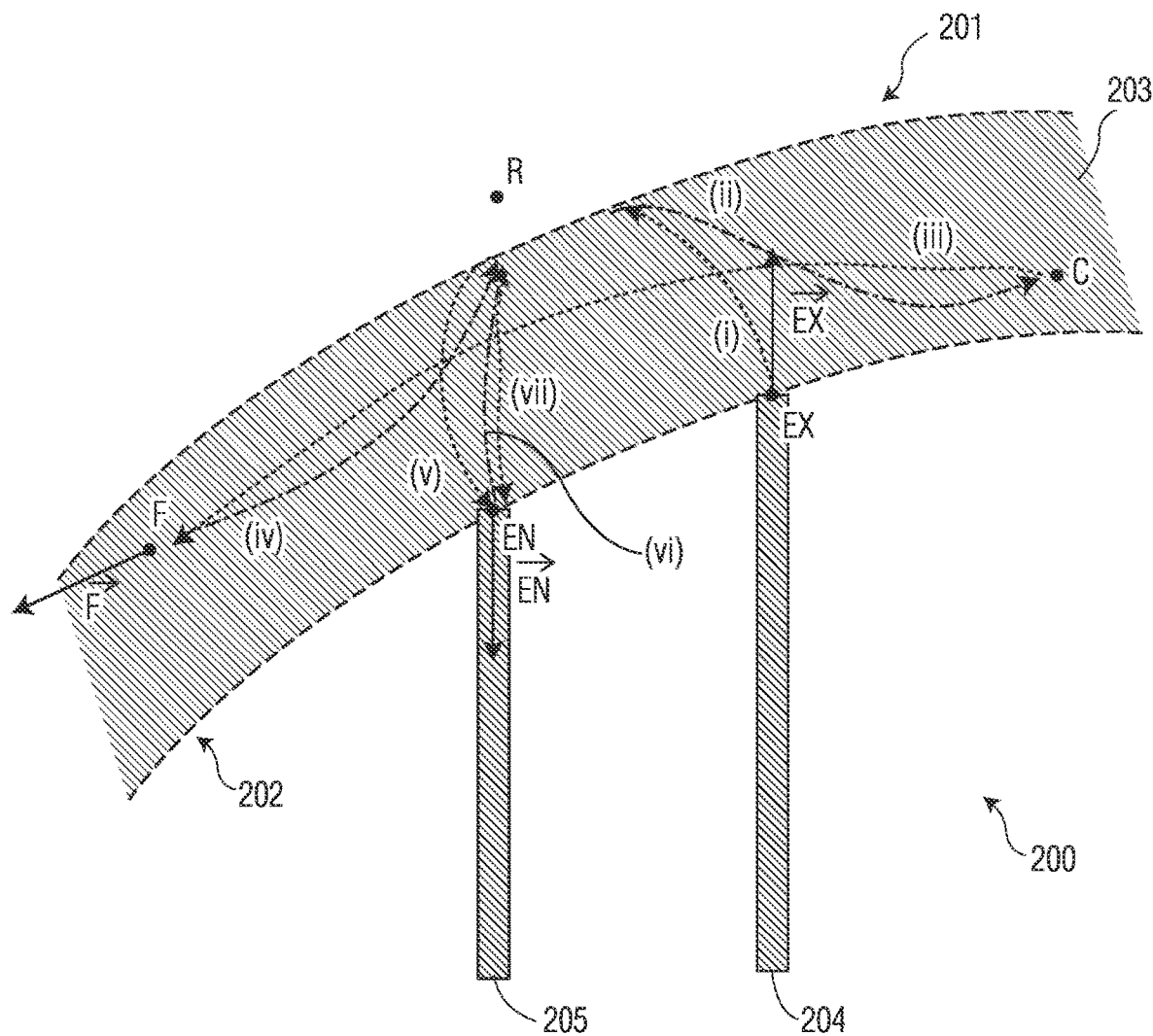
FIG. 7 schematically illustrates an exemplary end of row turnaround, in accordance with one or more embodiments herein.

FIG. 7 illustrates a turn performed with the reverse position R positioned outside the outer boundary 201. A vehicle is traveling along or parallel to a first furrow 204 and exits a field 200 along a field exit path $\overrightarrow{\text{EX}}$. Upon reaching the field exit position EX positioned on the inner boundary 202, the vehicle steers along path (i) toward the forward position F. The vehicle encounters the outer boundary 201 before reaching the forward position F. Upon encountering the outer boundary 201, the vehicle reverses toward the correction position C along path (ii). At the correction position C, the vehicle drives forward along path (iii) toward the forward position F. The vehicle reaches the forward position F pointing at a forward heading $\vec{\text{F}}$. The vehicle then reverses along path (iv) toward the reverse position R. The vehicle encounters the outer boundary 201 prior to reaching the reverse position R. Upon encountering the outer boundary 201, the vehicle drives forward along path (v) to the field re-entry position EN and reaches the field re-entry position EN positioned on the inner boundary 202 at a heading that is not aligned with the field re-entry path $\overrightarrow{\text{EN}}$. The vehicle reverses toward the reverse position R along path (vi) and again encounters the outer boundary 201 prior to reaching the reverse position R. Upon reaching the outer boundary 201, the vehicle drives forward along path (vii) to the field re-entry position EN and reaches the field re-entry position EN positioned on the inner boundary 202 at a heading directed along the field re-entry path $\overrightarrow{\text{EN}}$. Reversing toward position R may be repeated as needed (e.g., 1, 2, 3, 4, 5, or more times) to reach the field re-entry position EN positioned on the inner boundary 202 at a heading directed along the field re-entry path $\overrightarrow{\text{EN}}$. The vehicle then proceeds to travel along or parallel to a second furrow 205.

Figure 8:
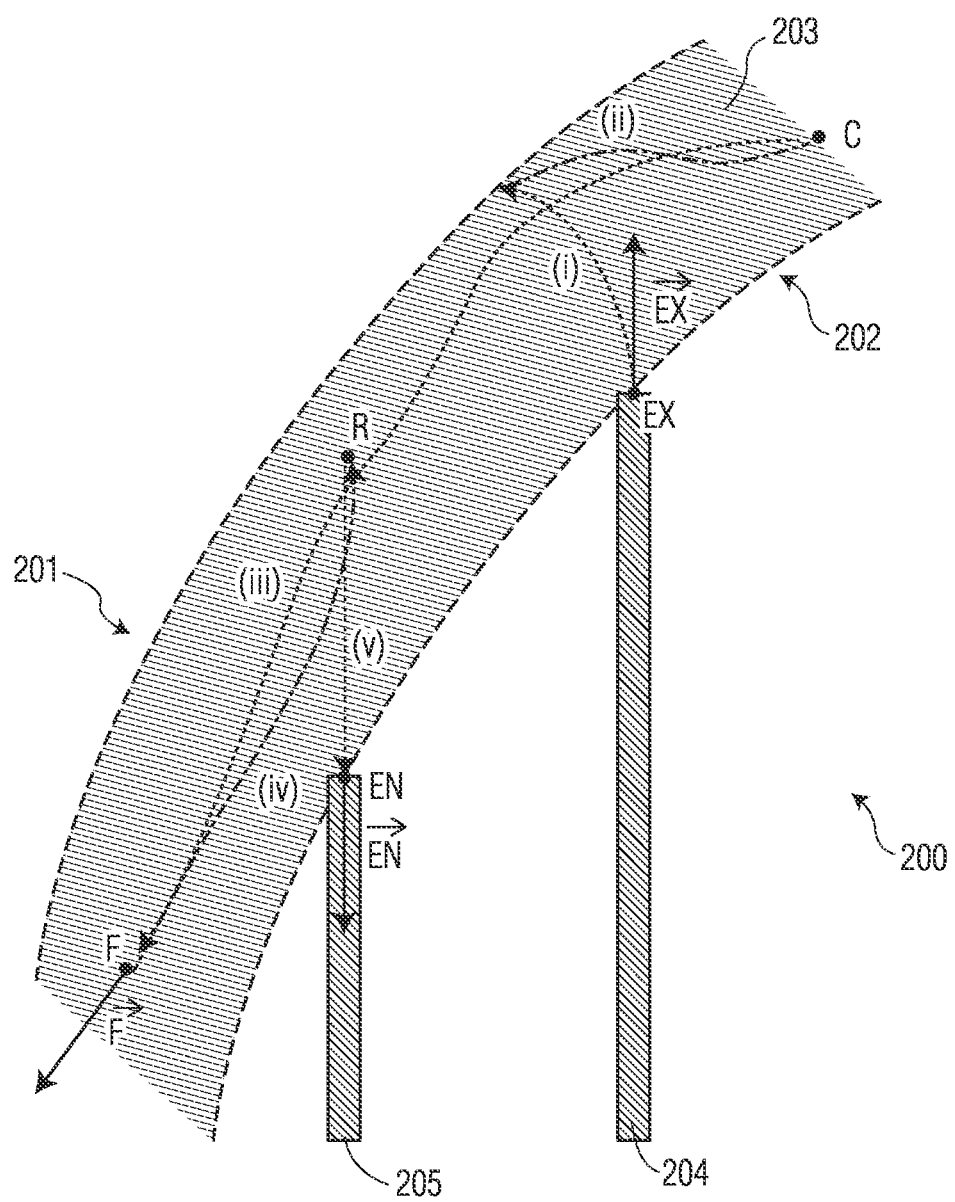
FIG. 8 schematically illustrates an exemplary end of row turnaround, in accordance with one or more embodiments herein.

FIG. 8 illustrates a turn performed in a turnaround area 203 at a region of the inner boundary 202 that is at a shallow angle relative to the furrows 204 and 205. A vehicle is traveling along or parallel to a first furrow 204 and exits a field 200 along a field exit path $\overrightarrow{\text{EX}}$. Upon reaching the field exit position EX positioned on the inner boundary 202, the vehicle steers along path (i) toward the forward position F. The vehicle encounters the outer boundary 201 before reaching the forward position F. Upon encountering the outer boundary 201, the vehicle reverses toward the correction position C along path (ii). At the correction position C, the vehicle drives forward along path (iii) toward the forward position F. The vehicle reaches the forward position F pointing at a forward heading $\vec{\text{F}}$. The vehicle then reverses along path (iv) toward the reverse position R. Upon reaching the reverse position R, the vehicle drives forward along path (v) to the field re-entry position EN and reaches the field re-entry position EN positioned on the inner boundary 202 at a heading directed along the field re-entry path $\overrightarrow{\text{EN}}$. The vehicle then proceeds to travel along or parallel to a second furrow 205. In this example, the vehicle is able to exploit the shallow angle of the inner boundary 202 to perform the turn in a narrow turnaround 203 area than if the inner boundary were perpendicular to the furrows 204 and 205.

In some embodiments, a vehicle may miss or pass a target position, or the vehicle may reach the target position at the wrong heading. In such cases, the vehicle may reverse (e.g., in a straight line or toward a different target position), adjust course, and attempt to reach the target position again. This process may be repeated (e.g., 1, 2, 3, 4, 5, or more times) until the vehicle reaches the target position.

In some embodiments, the reference points (e.g., a forward position, a correction position, a reverse position, etc.), boundaries (e.g., inner boundary, outer boundary, etc.) may be determined based on GPS coordinates. One or more GPS antennae (e.g., 2 antennae) may be positioned on a self-driving vehicle to accurately determine the location of the vehicle. In some embodiments, a base station may be positioned near the field (e.g., within about 100 miles) for improved GPS accuracy. Location coordinates may be converted between a geocoordinate frame of reference and a field plane of reference. In some embodiments, a field plane of reference may be expressed in two dimensions.

Figure 14:
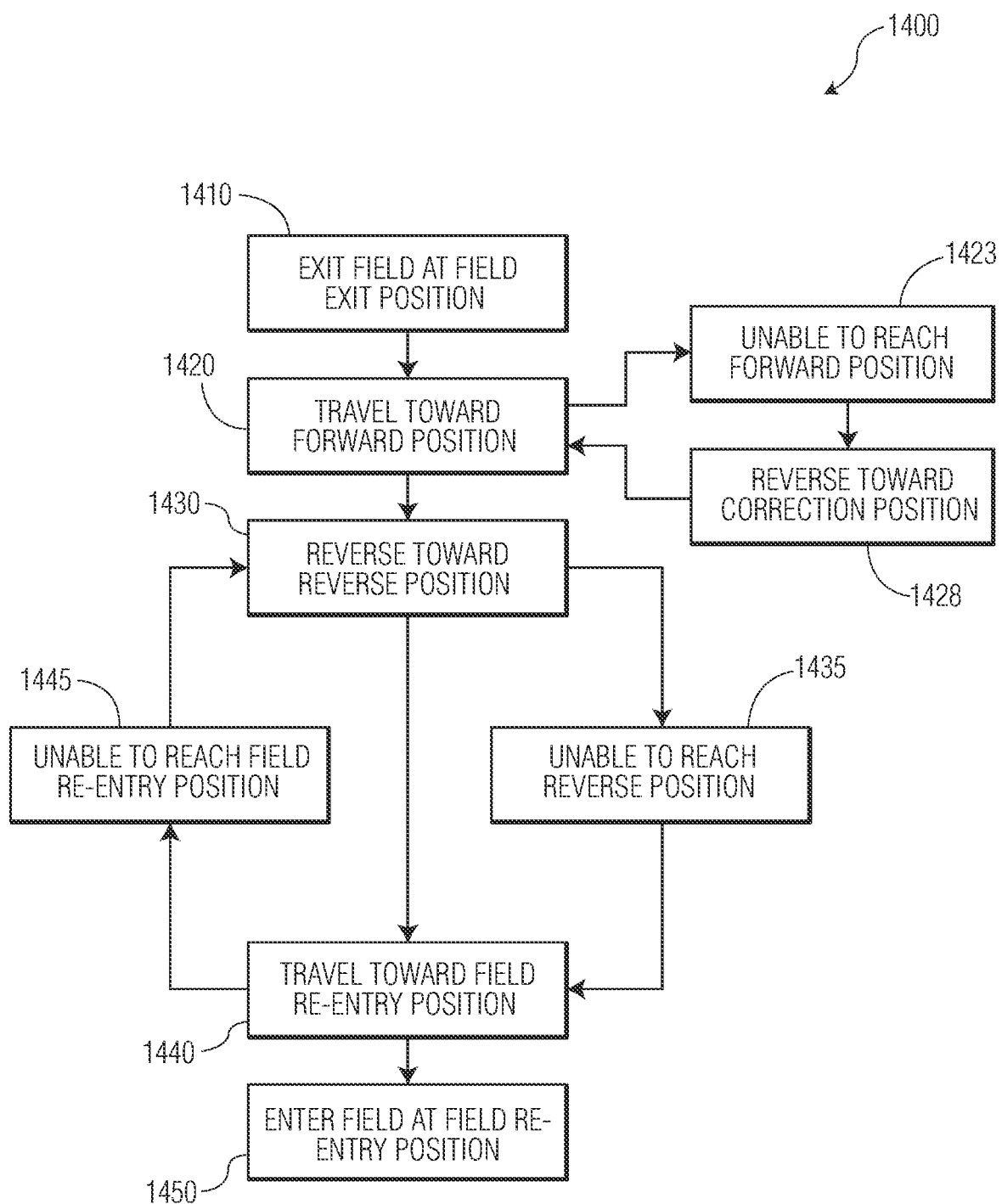
FIG. 14 is a flowchart illustrating a method of navigating a turn, in accordance with one or more embodiments herein.

An example of a method 1400 to autonomously execute a turn is provided in FIG. 14. The vehicle may exit a field from a field exit position (e.g., position EX shown in FIG. 4) at step 1410 and travel toward a forward position (e.g., position F shown in FIG. 4) at step 1420. If the vehicle is unable to reach the forward position 1423, the vehicle may reverse toward a correction position (e.g., position C shown in FIG. 4) at step 1428. The vehicle may then resume travel toward the forward position. At step 1430 (e.g., once the vehicle has reached the forward position), the vehicle may reverse (i.e., travel in a reverse direction) toward a reverse position (e.g., position R shown in FIG. 4). If the vehicle is unable to reach the reverse position 1435, the vehicle may travel toward a field re-entry position. At step 1440 (e.g., once the vehicle has reached the reverse position or has failed to reach the reverse position), the vehicle may travel toward the field re-entry position. If the vehicle is unable to reach the field re-entry position 1445, the vehicle may reverse toward the reverse position. At step 1450 (e.g., once the vehicle has reached the field re-entry position), the vehicle may re-entry the field at the field re-entry position. In some embodiments, the vehicle may initiate furrow following upon re-entering the field.

Human Intervention

In some embodiments, a self-driving vehicle system may encounter a situation in which it may not continue autonomously. In such situations when a failure condition is met, support may be requested from a human. The human may intervene to correct a course of the vehicle, or the human may determine that no intervention is needed. Human intervention may be requested in situations in which the vehicle has made multiple attempts to reach a target position and has not reached it. In such situations, the human may evaluate the vehicle or surrounding conditions and provide instructions for reaching the target position or a position from which the vehicle can autonomously reach the target position. Alternatively or in addition, human intervention may be requested if the vehicle exceeds a preset boundary or reaches a certain distance past or from the present boundary. The human may then evaluate the vehicle or surrounding conditions and provide instructions for re-entering the boundary or reaching a target position. Alternatively or in addition, human intervention may be requested if the vehicle is unable to detect a furrow at a field re-entry position or while following the furrow between a field re-entry position and a field exit position. The human may evaluate the vehicle or surrounding conditions and manually identify the furrow or provide instructions for reaching the furrow. Alternatively or in addition, human intervention may be requested if an obstacle is detected near or in the path of the vehicle. The human may evaluate the area surrounding the vehicle and provide instructions for avoiding the obstacle, or the human may determine that no obstacle is present.

In some embodiments, human intervention may be requested if the vehicle is unable to reach a target position or heading within a predetermined number of attempts. An alert may be generated by the self-driving vehicle system to request human intervention when the vehicle does not reach a target position (e.g., a field exit position, a correction position, a forward position, a reverse position, or field re-entry position) or a target heading (e.g., a field exit path, a field re-entry path, or a forward heading) within a predetermined number of attempts. For example, the alert may be generated after from 2 to 10 attempts, from 3 to 8 attempts, from 4 to 6 attempts, or about 5 attempts. Upon generating the alert, the system may pause motion and await instructions from the human. The human may receive information from the system about the vehicle, such as vehicle position (e.g., GPS position), steering position, wheel angle, distance from boundary (e.g., distance from outer boundary), or heading prior to generating the alert. The information received by the human may include sensor images collected by the system, satellite images of the vehicle, or proximity sensor data. The human may use the information to determine what, if any, manual intervention should be performed. In some embodiments, the human may determine that no intervention is needed and may instruct the system to resume autonomous operation. In some embodiments, the human may intervene by providing instructions to reach the target position or a position from which the vehicle can autonomously reach the target position. For example, the human may provide to the system a wheel angle, a speed, a distance, a heading, or combinations thereof. The system may execute the instructions to reach the target position or the position from which the vehicle can autonomously reach the target position. After executing the instructions, the system may resume autonomous operation.

In some embodiments, human intervention may be requested if the self-driving vehicle system is unable to detect a furrow at a furrow at a field re-entry position or while following the furrow between a field re-entry position and a field exit position. An alert may be generated by the system to request human intervention when the system is unable to detect the furrow upon field re-entry or during furrow following. Upon generating the alert, the system may pause motion and await instructions from the human. The human may receive information from the system about the vehicle, such as vehicle position (e.g., GPS position), steering position, wheel angle, distance from boundary (e.g., distance from outer boundary), or heading prior to generating the alert. The information received by the human may include sensor images collected by the system, satellite images of the vehicle, or proximity sensor data. The human may use the information to determine what, if any, manual intervention should be performed. In some embodiments, the human may determine that no intervention is needed and may instruct the system to resume autonomous operation. In some embodiments, the human may intervene by providing instructions to reach the furrow. For example, the human may provide to the system a wheel angle, a speed, a distance, a heading, or combinations thereof. The system may execute the instructions to reach the furrow. After executing the instructions, the system may resume autonomous operation.

In some embodiments, human intervention may be requested if the vehicle exceeds a boundary or reaches a certain distance past or from the boundary. The boundary may be an outer boundary or an outer geofence surrounding a turnaround area. An alert may be generated by the self-driving vehicle system to request human intervention when the vehicle exceeds the boundary or reaches a certain distance past or from the boundary. For example, the alert may be sent when the vehicle exceeds the boundary by a distance of from 0.5 to 1.5 vehicle lengths or about one vehicle length. Upon generating the alert, the system may pause motion and await instructions from the human. The human may receive information from the system about the vehicle, such as vehicle position (e.g., GPS position), steering position, wheel angle, distance from boundary (e.g., distance from outer boundary), or heading prior to generating the alert. The information received by the human may include sensor images collected by the system, satellite images of the vehicle, or proximity sensor data. The human may use the information to determine what, if any, manual intervention should be performed. In some embodiments, the human may determine that no intervention is needed and may instruct the system to resume autonomous operation. In some embodiments, the human may intervene by providing instructions to re-enter the turnaround area. For example, the human may provide to the system a wheel angle, a speed, a distance, a heading, or combinations thereof. The system may execute the instructions to re-enter the turnaround area. After executing the instructions, the system may resume autonomous operation.

In some embodiments, human intervention may be requested if an obstacle is detected by the self-driving vehicle system. An alert may be generated by the system to request human intervention when the obstacle is detected. In some embodiments, the object may be detected by a sensor positioned on the vehicle (e.g., a LIDAR sensor, a RADAR sensor, or a camera). Upon generating the alert, the system may pause motion and await instructions from the human. The human may receive information from the system about the vehicle, such as vehicle position (e.g., GPS position), steering position, wheel angle, distance from boundary (e.g., distance from outer boundary), or heading prior to generating the alert. The information received by the human may include sensor images collected by the system, satellite images of the vehicle, or proximity sensor data. The human may use the information to determine what, if any, manual intervention should be performed. In some embodiments, the human may determine that no intervention is needed and may instruct the system to resume autonomous operation. For example, the human may determine that no obstacle is present. In some embodiments, the human may intervene by instructing the vehicle to wait for the obstacle to move out of the way. In some embodiments, the human may intervene by providing instructions to maneuver around the obstacle. For example, the human may provide to the system a wheel angle, a speed, a distance, a heading, or combinations thereof. The system may execute the instructions to maneuver around the obstacle or wait for the obstacle to move. After executing the instructions, the system may resume autonomous operation.

In some embodiments, human intervention may be provided remotely. The self-driving vehicle system may send the alert, the vehicle information, sensor data, image data, or a combination thereof over a network. In some embodiments, the network may be a wi-fi network, a satellite network, a local area network, or a mobile data network. In some embodiments, the alert may be sent as a text, an email alert, or a mobile phone application notification. The human may review the vehicle information, the sensor data, the image data, or combinations thereof at a remote location. The human may send instructions over the network to the self-driving vehicle system, and the system may execute the instructions. In some embodiments, the human may remotely control the vehicle over the network.

In some embodiments, human intervention may be provided on-site (e.g., at the vehicle). For example, a human may be notified by a signal from the self-driving vehicle system (e.g., a sound or a light) or a notification sent over a network (e.g., as a text, an email alert, or a mobile phone application notification). Once alerted, the human may take control of or move the vehicle to correct the situation. For example, the human may take manual control of the vehicle to re-position the vehicle toward a furrow re-entry position. In another example, the human may manually drive the vehicle along a section of a furrow that a furrow detection system on the vehicle failed to detect until reaching a section of the furrow that the furrow detection system can detect.

Figure 15:
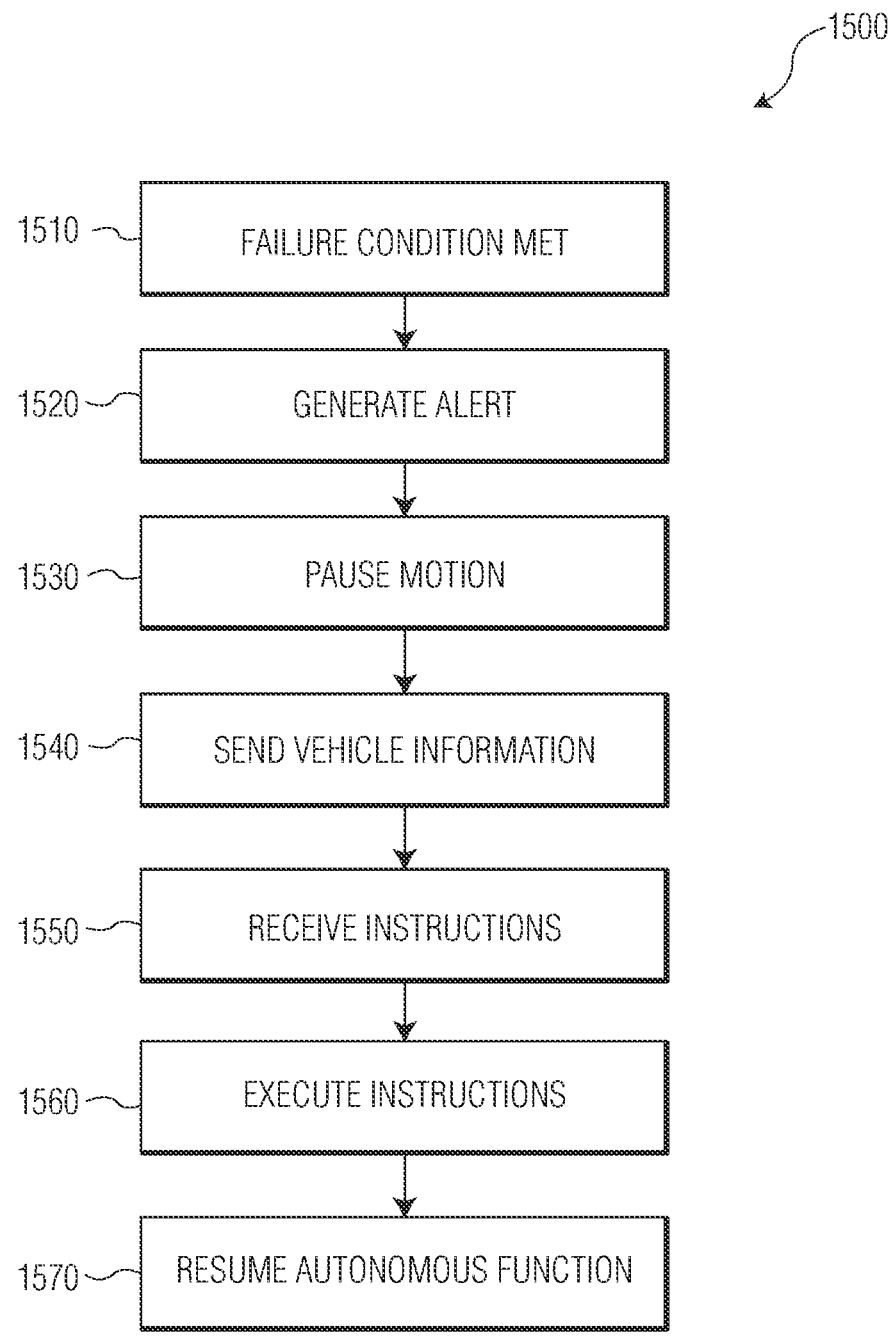
FIG. 15 is a flowchart illustrating a method of requesting human intervention, in accordance with one or more embodiments herein.

An example method 1500 for requesting human intervention is provided in FIG. 15. A failure condition (e.g., obstacle detection, failure to detect a furrow, failure to reach a target position, or a boundary is exceeded) is met at step 1510. Upon meeting the failure condition, an alert is generated at step 1520 and the vehicle pauses motion at step 1530. In some embodiments, the alert may be sent over a network (e.g., as a text, an email alert, or a mobile phone application notification). In some embodiments, the system may produce an audio or visual alert from the vehicle. For example, the vehicle may be equipped with lights that indicate whether the vehicle is operating in a manual mode or an autonomous mode. The self-driving vehicle system may send information, such as vehicle position, steering position, wheel angle, distance from boundary (e.g., distance from outer boundary), heading prior to pausing motion, sensor images collected by the system, satellite images of the vehicle, or proximity sensor data, to the human at step 1540. The information may be sent over a network (e.g., a wi-fi network, a satellite network, a local area network, or a mobile data network). The system may await instructions from the human. At step 1550, the system may receive instructions from the human. In some embodiments, the instructions may comprise a wheel angle, a speed, a distance, a heading, or combinations thereof. In some embodiments, the instructions may be that no intervention is needed. The system may execute the instructions at step 1560. For example, the system may maneuver the vehicle as instructed by the human. Upon executing the instructions, or upon receiving instructions that no intervention is needed, the system may resume autonomous function at step 1570.

Computer Systems and Methods

The detection and navigation methods described herein may be implemented using a computer system. In some embodiments, the detection and navigation systems described herein include a computer system. In some embodiments, a computer system may implement the detection and navigation methods autonomously without human input. In some embodiments, a computer system may implement the detection and navigation methods based on instructions provided by a human user through a detection terminal.

Actual embodiments of the illustrated devices will have more components included therein which are known to one of ordinary skill in the art. For example, each of the illustrated devices will have a power source, one or more processors, computer-readable media for storing computer-executable instructions, and so on. These additional components are not illustrated herein for the sake of clarity.

Figure 13:
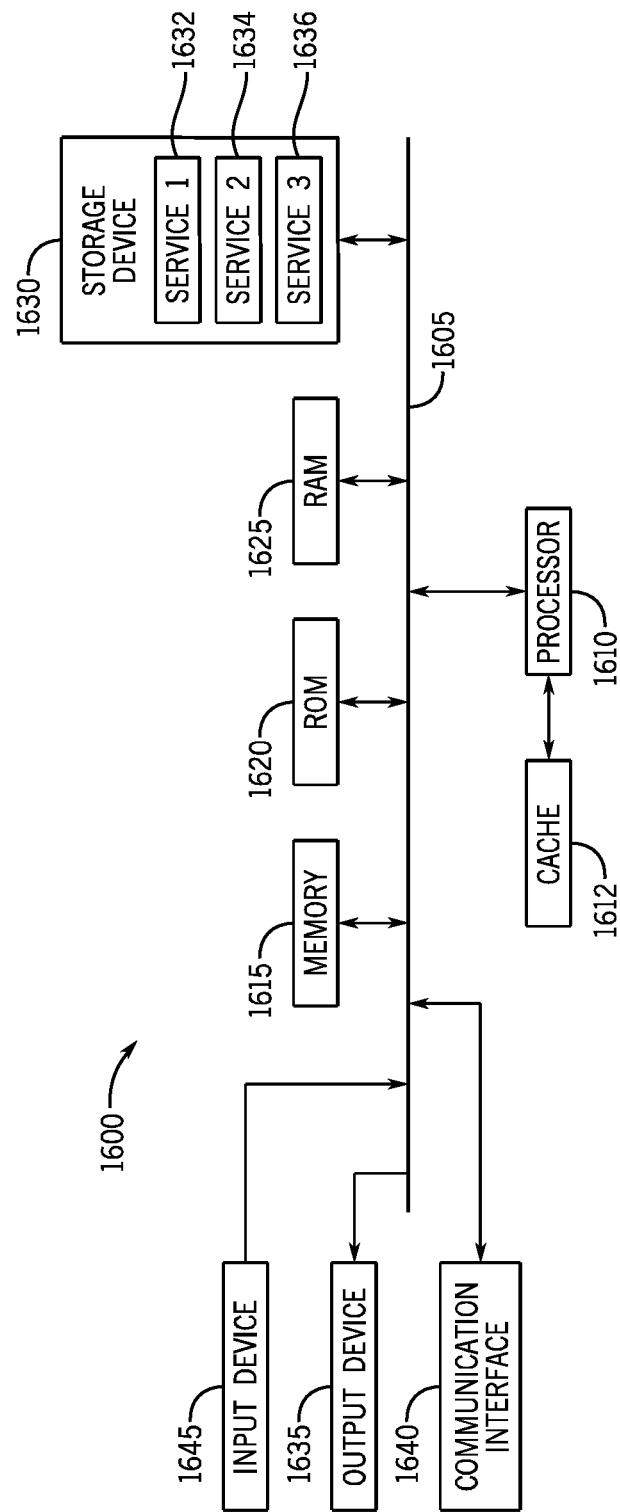
FIG. 13 is an exemplary block diagram of a computing device architecture of a computing device which can implement the various techniques described herein.

In some examples, the procedures described herein (e.g., the procedure of FIG. 12, or other procedures described herein) may be performed by a computing device or apparatus, such as a computing device having the computing device architecture 1600 shown in FIG. 13. In one example, the procedures described herein can be performed by a computing device with the computing device architecture 1600. The computing device can include any suitable device, such as a mobile device (e.g., a mobile phone), a desktop computing device, a tablet computing device, a wearable device, a server (e.g., in a software as a service (SaaS) system or other server-based system), and/or any other computing device with the resource capabilities to perform the processes described herein, including the procedure of FIG. 12. In some cases, the computing device or apparatus may include various components, such as one or more input devices, one or more output devices, one or more processors, one or more microprocessors, one or more microcomputers, and/or other component that is configured to carry out the steps of processes described herein. In some examples, the computing device may include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

A procedure is illustrated in FIG. 12, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 13 illustrates an example computing device architecture 1600 of an example computing device which can implement the various techniques described herein. For example, the computing device architecture 1600 can implement procedures shown in FIG. 12, or control the vehicles shown in FIG. 1 and FIG. 2. The components of computing device architecture 1600 are shown in electrical communication with each other using connection 1605, such as a bus. The example computing device architecture 1600 includes a processing unit (which may include a CPU and/or GPU) 1610 and computing device connection 1605 that couples various computing device components including computing device memory 1615, such as read only memory (ROM) 1620 and random-access memory (RAM) 1625, to processor 1610. In some embodiments, a computing device may comprise a hardware accelerator.

Computing device architecture 1600 can include a cache of high-speed memory connected directly with, in close proximity to, or integrated as part of processor 1610. Computing device architecture 1600 can copy data from memory 1615 and/or the storage device 1630 to cache 1612 for quick access by processor 1610. In this way, the cache can provide a performance boost that avoids processor 1610 delays while waiting for data. These and other modules can control or be configured to control processor 1610 to perform various actions. Other computing device memory 1615 may be available for use as well. Memory 1615 can include multiple different types of memory with different performance characteristics. Processor 1610 can include any general-purpose processor and a hardware or software service, such as service 1 1632, service 2 1634, and service 3 1636 stored in storage device 1630, configured to control processor 1610 as well as a special-purpose processor where software instructions are incorporated into the processor design. Processor 1610 may be a self-contained system, containing multiple cores or processors, a bus, memory controller, cache, etc. A multi-core processor may be symmetric or asymmetric.

To enable user interaction with the computing device architecture 1610, input device 1645 can represent any number of input mechanisms, such as a microphone for speech, a touch-sensitive screen for gesture or graphical input, keyboard, mouse, motion input, speech and so forth. Output device 1635 can also be one or more of a number of output mechanisms known to those of skill in the art, such as a display, projector, television, speaker device, etc. In some instances, multimodal computing devices can enable a user to provide multiple types of input to communicate with computing device architecture 1600. Communication interface 1640 can generally govern and manage the user input and computing device output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof. Storage device 1630 can include services 1632, 1634, 1636 for controlling processor 1610. Other hardware or software modules are contemplated. Storage device 1630 can be connected to the computing device connection 1605. In one aspect, a hardware module that performs a particular function can include the software component stored in a computer-readable medium in connection with the necessary hardware components, such as processor 1610, connection 1605, output device 1635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory, or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

While illustrative embodiments have been illustrated and described, it will be appreciated that various changes can be made therein without departing from the spirit and scope of the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

As used herein, the terms "about" and "approximately," in reference to a number, is used herein to include numbers that fall within a range of 10%, 5%, or 1% in either direction (greater than or less than) the number unless otherwise stated or otherwise evident from the context (except where such number would exceed 100% of a possible value).

While preferred embodiments of the present invention have been shown and described herein, it will be apparent to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for autonomously driving a vehicle, the system comprising:
    a steering controller to drive the vehicle;
    a processor coupled to the steering controller, wherein the processor is configured to determine a first turnaround area corresponding to a first field exit path having a first field exit position and a first field re-entry path and having a first field re-entry position, wherein the first turnaround area is bound by an outer boundary and an inner boundary, wherein the outer boundary encompasses the inner boundary, wherein the inner boundary extends through the first field exit position and the first field re-entry position, and wherein the inner boundary encompasses a planting region in a field;
    a location sensor coupled to the processor to identify a location of the vehicle; and
    memory coupled to the processor storing instructions that, when executed by the processor, cause the steering controller to execute a first turn by:
        driving the vehicle along the first field exit path toward the first field exit position at the inner boundary,
        upon encountering the inner boundary at the first field exit position, driving the vehicle toward a first forward position,
        upon encountering the outer boundary, reversing the vehicle toward a first correction position,
        upon reaching the first correction position, driving the vehicle toward the first forward position,
        upon reaching the first forward position, reversing the vehicle toward a first reverse position, and
        upon reaching the first reverse position or encountering the outer boundary, driving the vehicle forward toward the first field re-entry position at the inner boundary.

2. The system of claim 1, wherein the first forward position is positioned at least one vehicle width from the first field re-entry position in a direction opposite the first field re-entry path and at least one vehicle turning radius from the first field re-entry position in a direction opposite the first field exit position.

3. The system of claim 1, wherein a first forward heading is parallel to a line connecting the first field exit position to the first field re-entry position.

4. The system of claim 1, wherein the first correction position is positioned at least one vehicle length from the first field exit position in a direction opposite the first field re-entry position.

5. The system of claim 1, wherein the first reverse position is positioned at least one vehicle length from the first field re-entry position in a direction opposite the first field re-entry path.

6. The system of claim 1, wherein the first field re-entry position is positioned along the inner boundary.

7. The system of claim 1, wherein the first field exit path is parallel to the first field re-entry path.

8. The system of claim 1, wherein a region of the inner boundary between the first field exit position and the first field re-entry position is not perpendicular to the first field exit path, the first field re-entry path, or both.

9. The system of claim 1, wherein the first field exit path, the first field re-entry path, or both are parallel to a furrow in the field.

10. The system of claim 1, wherein the first turn is further executed by:
    before reaching the first reverse position and upon encountering the outer boundary, reversing the vehicle toward the first field re-entry position; and
    upon reaching the first field re-entry position oriented in a direction other than along the first field re-entry path, reversing the vehicle toward the first reverse position.

11. The system of claim 1, wherein the first turn is determined in real time, determined adaptively, or both.

12. The system of claim 1, wherein the processor is further configured to determine a second turnaround area corresponding to a second field exit path having a second field exit position and a second field re-entry path and having a second field re-entry position, wherein the second turnaround area is bound by the outer boundary and the inner boundary, wherein the inner boundary extends through the second field exit position and the second field re-entry position; and wherein the instructions further cause the steering controller to execute a second turn by:
    driving the vehicle along the second field exit path toward the second field exit position;
    upon encountering the inner boundary at the second field exit position, driving the vehicle toward a second forward position;

upon reaching the second forward position, reversing the vehicle toward a second reverse position; and upon reaching the second reverse position or encountering the outer boundary, reversing the vehicle toward the second field re-entry position at the inner boundary.

13. The system of claim 12, wherein the processor is further configured to detect a furrow between the first field re-entry position and the second field exit position.

14. The system of claim 13, wherein the instructions, when executed by the processor, further cause the steering controller to follow the furrow to the second field exit position.

15. The system of claim 1, wherein the first field exit position, the first field exit path, the first field re-entry position, the first field re-entry path, the first forward position, the first correction position, the first reverse position, or a combination thereof are determined in real time, determined adaptively, or both.

16. The system of claim 1, wherein the first field exit position, the first field exit path, the first field re-entry position, the first field re-entry path, the first forward position, the first correction position, the first reverse position, or a combination thereof are independent of a speed of the vehicle, independent of a turning rate of the vehicle, or both.

17. The system of claim 1, wherein the processor is further configured to generate an alert to request human intervention.

18. The system of claim 17, wherein the alert is generated when:
(a) the vehicle fails to reach the first field exit position, the first correction position, the first forward position, the first reverse position, or the first field re-entry position after a predetermined number of attempts;
(b) when the vehicle crosses the outer boundary or exceeds the outer boundary by a predetermined distance;
(c) when the system fails to detect a furrow at the first field re-entry position or between the first field re-entry position and the second field exit position; or
(d) when the system detects an obstacle.

19. The system of claim 17, wherein the processor is further configured to transmit an image collected from the vehicle, the location of the vehicle, a position of the steering controller, a satellite image of the vehicle, or combinations thereof over a network upon generation of the alert.

20. The system of claim 17, wherein the processor is further configured to receive instructions from a human after the alert is generated.

21. The system of claim 1, wherein the vehicle is a tractor, a weeder, a sprayer, or a planter.

22. A method for autonomous navigation of a field, the method comprising:
determining a first turnaround area corresponding to a first field exit path having a first field exit position and a first field re-entry path and having a first field re-entry position, wherein the first turnaround area is bound by an outer boundary and an inner boundary, wherein the outer boundary encompasses the inner boundary, wherein the inner boundary extends through the first field exit position and the first field re-entry position, and wherein the inner boundary encompasses a planting region in the field;
instructing a vehicle to drive along the first field exit path toward the first field exit position at the inner boundary;
upon encountering the inner boundary at the first field exit position, instructing the vehicle to drive toward a first forward position;
upon encountering the outer boundary, instructing the vehicle to reverse toward a first correction position;
upon reaching the first correction position, instructing the vehicle to drive toward the first forward position;
upon reaching the first forward position, instructive the vehicle to reverse toward a first reverse position; and
upon reaching the first reverse position or encountering the outer boundary, instructing the vehicle to drive forward toward the first field re-entry position at the inner boundary.

23. The method of claim 22, further comprising instructing the vehicle to drive at a variable speed.

24. The method of claim 22, further comprising, before reaching the first reverse position and upon encountering the outer boundary, instructing the vehicle to reverse toward the first field re-entry position; and upon reaching the first field re-entry position oriented in a direction other than along the first field re-entry path, instructing the vehicle to reverse toward the first reverse position.

25. The method of claim 22, further comprising:
determining a second turnaround area corresponding to a second field exit path having a second field exit position and a second field re-entry path and having a second field re-entry position, wherein the second turnaround area is bound by the outer boundary and the inner boundary, wherein the inner boundary extends through the second field exit position and the second field re-entry position;
instructing the vehicle to drive along the second field exit path toward the second field exit position;
upon encountering the inner boundary at the second field exit position, instructing the vehicle to drive toward a second forward position;
upon reaching the second forward position, instructing the vehicle to reverse toward a second reverse position; and
upon reaching the second reverse position or encountering the outer boundary, instructing the vehicle to reverse toward the second field re-entry position at the inner boundary.

26. The method of claim 25, further comprising instructing the vehicle to follow a furrow between the first field re-entry position and the second field exit position.

27. The method of claim 22, wherein the method is determined in real time, determined adaptively, or both.

28. The method of claim 22, further comprising determining the first field exit position, the first field exit path, the first field re-entry position, the first field re-entry path, the first forward position, the first correction position, the first reverse position, or a combination thereof based on a sensor input.

* * * * *